(12) United States Patent
Cyzs et al.

(10) Patent No.: US 9,496,904 B2
(45) Date of Patent: Nov. 15, 2016

(54) METHODS AND SYSTEMS FOR PROCESSING RECEIVED SIGNALS FOR A WIRELESS NETWORK RECEIVER

(71) Applicant: Ubiqam, Ltd., Petach-Tikva (IL)

(72) Inventors: Baruch Cyzs, Kiryat-Motzkin (IL); Amir Meir, Tel-Aviv (IL); Oren Amidan, Tzur-Yigal (IL); Daniel Manor, Tel-Aviv (IL)

(73) Assignee: Ubiqam Ltd., Petach-Tikva (IL)

(*) Notice: Subject to any disclaimer, the term of this patent is extended or adjusted under 35 U.S.C. 154(b) by 0 days.

(21) Appl. No.: 14/767,644

(22) PCT Filed: Feb. 13, 2014

(86) PCT No.: PCT/IL2014/050162
§ 371 (c)(1),
(2) Date: Aug. 13, 2015

(87) PCT Pub. No.: WO2014/125491
PCT Pub. Date: Aug. 21, 2014

(65) Prior Publication Data
US 2015/0381221 A1 Dec. 31, 2015

(30) Foreign Application Priority Data

Feb. 14, 2013 (IL) .......................................... 224732

(51) Int. Cl.
*H03D 1/04* (2006.01)
*H04B 1/10* (2006.01)
(Continued)

(52) U.S. Cl.
CPC .......... *H04B 1/1027* (2013.01); *H04B 1/7097* (2013.01); *H04B 7/086* (2013.01); *H04J 11/0066* (2013.01); *H04W 72/0453* (2013.01)

(58) Field of Classification Search
CPC ..... H04L 27/2647; H04L 1/06; H04B 1/712; H04B 7/0877; H04B 7/00; H04B 1/0003; H04B 1/1027
USPC .............. 375/346–350; 455/63.1, 67.13, 501
See application file for complete search history.

(56) References Cited

U.S. PATENT DOCUMENTS

2004/0198235 A1* 10/2004 Sano ........................ H04B 7/00
455/69
2006/0109931 A1* 5/2006 Asai ..................... H04B 1/0003
375/299

(Continued)

FOREIGN PATENT DOCUMENTS

| GB | 2240695 | 8/1991 |
|----|---------|--------|
| WO | WO 2011/148341 | 12/2011 |
| WO | WO 2014/125491 | 8/2014 |

OTHER PUBLICATIONS

Communication Relating to the Results of the Partial International Search Dated May 27, 2014 From the International Searching Authority Re. Application No. PCT/IL2014/050162.

(Continued)

*Primary Examiner* — Khanh C Tran

(57) ABSTRACT

There is provided systems and methods for mitigating foreign interference by complementing a receiver of a wireless network, comprising: using antennas for reception of desired signals and interference signals; determining the presence of an interference signal originating from at least one foreign transmitting source in the received signals, and for determining a termination of the interference signal; determining the presence of a desired signal originating from the wireless communication network in the received signals; calculating a suitable combination of the received signals, wherein the effect induced by the interference signal is reduced and the impact of an interference cancellation on the desired signals is reduced; and providing the suitable combination to a receiver of a wireless communication network; wherein the method is performed complementary to the receiver of the wireless network and the antennas.

37 Claims, 8 Drawing Sheets

(51) Int. Cl.
*H04B 1/7097* (2011.01)
*H04J 11/00* (2006.01)
*H04B 7/08* (2006.01)
*H04W 72/04* (2009.01)

(56) References Cited

U.S. PATENT DOCUMENTS

| | | |
|---|---|---|
| 2006/0269023 A1 | 11/2006 | Chimitt et al. |
| 2011/0090996 A1* | 4/2011 | Hahm .................... H04B 1/712 375/347 |
| 2015/0200721 A1* | 7/2015 | Hwang ................ H04B 7/0877 455/63.1 |

OTHER PUBLICATIONS

International Preliminary Report on Patentability Dated Aug. 27, 2015 From the International Bureau of WIPO Re. PCT/IL2014/050162.

International Search Report and the Written Opinion Dated Jul. 17, 2014 From the International Searching Authority Re. PCT/IL2014/050162.

* cited by examiner

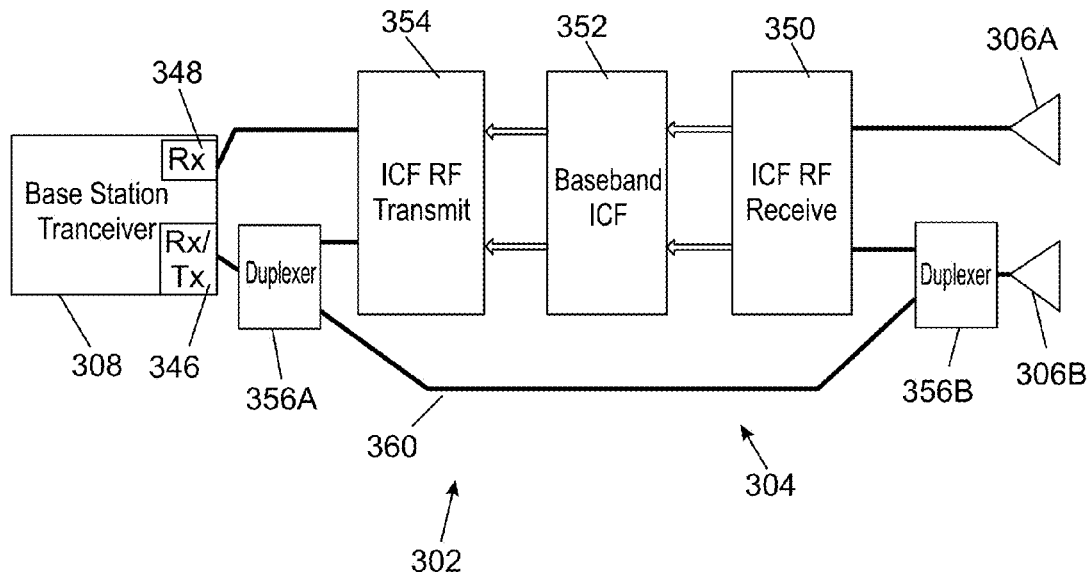
FIG. 3
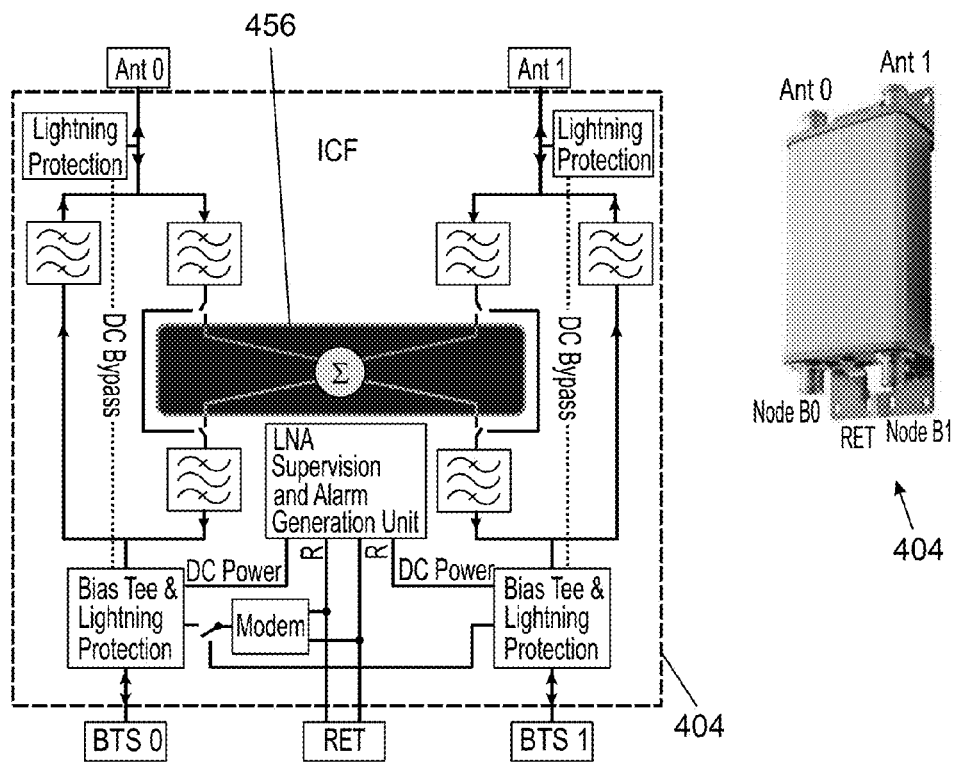
FIG. 4A
FIG. 4B

METHODS AND SYSTEMS FOR PROCESSING RECEIVED SIGNALS FOR A WIRELESS NETWORK RECEIVER

RELATED APPLICATIONS

This application is a National Phase of PCT Patent Application No. PCT/IL2014/050162 having International filing date of Feb. 13, 2014, which claims the benefit of priority of Israeli Patent Application No. 224732 filed on Feb. 14, 2013. The contents of the above applications are all incorporated by reference as if fully set forth herein in their entirety.

FIELD AND BACKGROUND OF THE PRESENT INVENTION

The present invention, in some embodiments thereof, relates to data communication networks and, more particularly, but not exclusively, to systems and methods for cancellation of interference signals transmitted by interference transmitters.

Wireless communication network (e.g., cellular networks) receivers are susceptible to interference from different sources. One type of interference originates from a foreign interferer, a transmitter that is not part of the immediate network. The interference may originate, for example, from a remotely located transmitter, carried by atmospheric propagation such as a tropospheric duct, or from a near-by located transmitter that transmits on frequencies that are overlapping and/or adjacent to the spectrum used by the interfered receiver. Remote interferers may broadcast transmissions such as analog or digital TV from other countries.

The transmission may occur on the same channel as the cellular network, for a variety of reasons for example, due to lack of harmonization between countries with respect to use of spectrum, or through remote time-division duplex (TDD) base stations that exhibit large propagation delays which hamper the uplink/downlink duplexing separation that was planned through synchronized TDD.

There are several scenarios that may result in unwanted interference at the received spectrum of a base-station or access point. One example is intentional interference, also known as jamming. Such interference is created intentionally in order to harm a wireless network and prevent communication. Jammers may be employed in defense scenarios and the proposed solution may be used to protect a communication system against hostile jammers.

In civilian communication the usage of jammers is rare and in many cases the interference is caused unintentionally. For example, the interference may be a result of transmission in a different spectrum resulting in interference due to radiofrequency (RF) impairments in the desired signal spectrum. Several reasons for interference include, for example, differences in usage of licensed spectrum among countries, usage of Time Domain Duplexing schemes, and usage of unlicensed spectrum.

In different countries, the same parts of the spectrum may be used for different applications. For example, in one country a certain spectrum is used for uplink cellular communications (communication from the users to the base-station) while in another country the same spectrum is used for TV broadcasting. This scenario may result in strong interference signals being generated by the broadcast transmitters when received by a cellular base-station. Such phenomenon may be significantly intensified by tropospheric ducts that may extend the range of the interfering signals by hundreds or even thousands of kilometers. As a result, interference due to lack of spectral harmonization may be present between countries which do not have a common border.

In another example, self interference may be created by a Time Domain Duplexing (TDD) regime network among sites separated by large distances during strong propagation created by tropospheric ducts. A tropospheric duct carrying a signal beyond the optical horizon may result in unwanted interference where the network sites are synchronized to a specific downlink/uplink framing in time so that all the network base-stations are transmitting or receiving at the same time. When weather conditions create strong duct propagation, these TDD signals may travel for several tens or hundreds of kilometers, and hit another site of the same TDD network. The time delay over the duct can be several hundreds of micro-seconds or even more than one millisecond. The delay may result in downlink signals transmitted from one site during downlink frame time, being received during uplink frame time at a site located tens or hundreds of kilometers away.

Another example of interference created in TDD network implementations, are cases where different or unsynchronized TDD networks are used within the same or neighboring areas. For instance, two operators using different downlink/uplink ratios, or even the same ratio but out of phase might interfere with each other if they have adjacent spectrum or the same spectrum across two sides of a common border.

In the case of two TDD technologies (e.g., WiMAX and TD-LTE) being used in the same geographic area, the different frame structures make it impossible to synchronize them, and hence interference is inevitable.

In yet another example of interference resulting from different spectral regimes between countries, is a case where a part of the spectrum is licensed in one country, but unlicensed in another country. For example, the spectrum between 902 Mega-Hertz (MHz) and 915 MHz is part of the GSM uplink band used in Europe, The Middle East and other parts of the world. In North America this spectrum is part of the ISM license free band and used for cordless phones, surveillance cameras and other consumer applications.

As a result, equipment purchased in North America operating in the 900 MHz ISM band that is then brought to and used in Europe or other areas where the 900 MHz spectrum is used for cellular communication, may result in unwanted interference in base-station sites.

Yet another case of interference generated by misuse of equipment in licensed frequencies, are oscillating repeaters/bi-directional amplifiers, due to lack of isolation between their service and donor antennas.

When using unlicensed spectrum, interference can be expected from other communication systems sharing the same spectrum. Methods for avoiding interference, for example, retransmission MAC, frequency hopping, and other methods, may enable reliable communication over unlicensed frequency at the expense of throughput and capacity.

SUMMARY OF THE PRESENT INVENTION

An aspect of some embodiments of the present invention relates to systems and/or methods for mitigating foreign interference by calculating a suitable combination of the received signals, where both the interference signal is reduced and the impact of the interference cancellation on the desired signals is reduced. Optionally, the systems and/or methods switch from using multiple antennas arranged for antenna diversity when interference signals interfere with received desired signals, to operating the multiple antennas in diversity mode when interference signals do not interfere with received desired signals.

According to an aspect of some embodiments of the present invention there is provided an add-on receiver module for mitigating foreign interference complementing a receiver of a wireless network, the receiver module comprising: a first interface for electrically coupling to a plurality of antennas of a group of antennas for reception of desired signals and interference signals; a hardware processor; and a non-transitory memory having stored thereon program modules for instruction execution by the hardware processor, comprising: an interference determination module for determining the presence of an interference signal originating from at least one foreign transmitting source in the received signals, and for determining a termination of the interference signal; a desired signal detection module for determining the presence of a desired signal originating from the wireless communication network in the received signals; an interference cancellation module for calculating a suitable combination of the received signals, wherein the effect induced by the interference signal is reduced and the impact of an interference cancellation on the desired signals is reduced; and a second interface for electrically coupling to a receiver of a wireless communication network, wherein the suitable combination is provided to the receiver by the second interface; wherein the receiver module operates complementary to the receiver of the wireless network and the plurality of antennas.

According to some embodiments of the present invention, the receiver module operates blindly on the received signals.

According to some embodiments of the present invention, the interference determination module determines the presence of the interference signal based on the received signals without additional information from the wireless network, the desired signal detection module determines the presence of the desired signal based on the received signals without additional information from the wireless network, and the interference cancellation module calculates the suitable combination without additional information from the wireless network. Optionally, without additional information comprises one or more of: controlling transmission of signals within the wireless communication network, requesting transmission of special signals, muting the wireless communication network, and polling elements within the wireless communication network. Alternatively or additionally, without additional information comprises one or more of: exploiting instantaneous signature within the desired signals. Alternatively or additionally, without additional information comprises exploiting one or more of: pilot signals, preamble signals, sounding signals within the desired signals.

According to some embodiments of the present invention, the receiver module operates externally to the receiver of the wireless network and the plurality of antennas.

According to some embodiments of the present invention, the receiver module further comprises a synthetic noise module for injecting synthetic correlated noise signals into each received desired signals antenna input, the number of injected correlated noise signals being equal to the number of antennas, the synthetic noise generated to prevent suppression of received desired signals when a number of transmitting client transceivers is lower than the number of antennas, the suitable combination based on the injected synthetic correlated noise signals.

According to some embodiments of the present invention, concurrent interference signals in the same frequency sub-bands are received with concurrent desired signals in the same frequency sub-bands, the received power of the interference signals being significantly higher than the received power of the desired signal, the suitable combination calculated such that cancellation weights calculated based on existence of interference and desired signal reject the output interference signal, and leave the desired signal provided to the receiver of a base station substantially unaffected.

According to some embodiments of the present invention, the interference cancellation module is further programmed calculate the suitable combination based on calculating a plurality of cancellation weights, the cancellation weights correspond to frequency sub-bands that do not carry dominant interference signals are set to zero, so that a diversity scheme of the received signals is substantially preserved for performance of the diversity scheme in the receiver of a base station, and the expected change in the wireless channel of the received desired signal as measured by the base station in frequency sub-bands where there are no dominant interference signals is negligible.

According to some embodiments of the present invention, the interference cancellation module is further programmed to perform interference cancellation in the frequency domain, and filters are added with a frequency domain beam former module that multiplies frequency domain weights with output from bins of a Fast Fourier Transform (FFT) process for both inputs, adding the results together in the frequency domain bin based on prior Inverse Fast Fourier Transform (IFFT) and/or in time domain sample by sample after the IFFT process. Optionally, interference cancellation is performed in the frequency domain based on FFT, IFFT overlap and/or Save or Window Overlap filters.

According to some embodiments of the present invention, the interference determination module is further programmed to track the interference signals to detect changes in the received interference signals, the suitable combination based on the detected changes. Optionally, interference cancellation is applied during tracking of the received interference signals to avoid cancelling the desired signals when undesired interference signals are absent, the suitable combination based on avoiding cancellation of the desired signals.

According to some embodiments of the present invention, the interference determination module and/or the desired signal detection module are further programmed to determine when the power level of the interference signals is near or less than the power level of desired signals, the suitable combination based on the detected power level.

According to some embodiments of the present invention, the suitable combination is based on avoiding cancellation of a desired signal rather than interference signals.

According to some embodiments of the present invention, the interference determination module and/or the desired signal detection module are further programmed to determine by detecting time periods where desired signals are not received, and identifying the interference signals during the time periods. Optionally, the time periods are guard intervals of communication protocols.

According to some embodiments of the present invention, the interference determination module and/or the desired signal detection module are further programmed to determine based on detecting received desired signals based on certain characteristics of the received desired signals.

According to some embodiments of the present invention, the receiver module further comprises one or more switch modules for directing the received signals to interference cancellation or to diversity reception, based on the interference determination module determination, the suitable combination comprising applying interference cancellation or diversity reception.

According to some embodiments of the present invention, the receiver module is arranged as a self-contained structure for coupling to the receiver of the wireless network and the plurality of antennas.

According to some embodiments of the present invention, the number of antenna inputs into the first interface is higher than the number of signal outputs to the receiver through the second interface, wherein the number of interference signals is less than the number of antennas minus one, wherein there are sufficient degrees of freedom to perform the interference cancellation and to preserve the inherent diversity gain. Optionally, the receiver module provides to the receiver inputs signals with reduced cross correlation among each antenna input couple, so that diversity gain is achieved by providing to each receiver input different composite antenna array patterns through certain settings of beam former weights, wherein each receiver is connected to certain composite antenna array patterns with common nulls toward the interference signal direction and/or polarization, with a beam steered toward different direction and/or polarization of a base station cell geometry. Optionally, there are no interference signals present, and the receiver module converts certain N number of antennas to M base station diversity inputs where M<N.

According to some embodiments of the present invention, the desired signal detection module for determining the presence of a desired signal originating from the wireless communication network in the received signals exploits long term known statistic parameters of the desired signals.

According to an aspect of some embodiments of the present invention there is provided a method for mitigating foreign interference by complementing a receiver of a wireless network, comprising: using a plurality of antennas of a group of antennas for reception of desired signals and interference signals; determining the presence of an interference signal originating from at least one foreign transmitting source in the received signals, and for determining a termination of the interference signal; determining the presence of a desired signal originating from the wireless communication network in the received signals; calculating a suitable combination of the received signals, wherein the effect induced by the interference signal is reduced and the impact of an interference cancellation on the desired signals is reduced; and providing the suitable combination to a receiver of a wireless communication network; wherein the method is performed complementary to the receiver of the wireless network and the plurality of antennas.

According to some embodiments of the present invention, the method is performed blindly on the received signals.

According to some embodiments of the present invention, the presence of the interference signal is determined based on the received signals without additional information from the wireless network, the presence of the desired signal is determined based on the received signals without additional information from the wireless network, and the suitable combination is calculated without additional information from the wireless network. Optionally, without additional information comprises one or more of: controlling transmission of signals within the wireless communication network, requesting transmission of special signals, muting the wireless communication network, and polling elements within the wireless communication network. Alternatively or additionally, without additional information comprises one or more of: exploiting instantaneous signature within the desired signals. Alternatively or additionally, without additional information comprises exploiting one or more of: pilot signals, preamble signals, sounding signals within the desired signals.

According to some embodiments of the present invention, the method is performed externally to the receiver of the wireless network and the plurality of antennas.

According to some embodiments of the present invention, the method further comprises injecting synthetic correlated noise signals into each received desired signals antenna input, the number of injected correlated noise signals being equal to the number of antennas, the synthetic noise generated to prevent suppression of received desired signals when a number of transmitting client transceivers is lower than the number of antennas, the suitable combination based on the injected synthetic correlated noise signals.

According to some embodiments of the present invention, concurrent interference signals in the same frequency sub-bands are received with concurrent desired signals in the same frequency sub-bands, the received power of the interference signals being significantly higher than the received power of the desired signal, the suitable combination calculated such that the cancellation weights calculated based on existence of interference and desired signal reject the output interference signal, and leave the desired signal provided to the receiver of a base station substantially unaffected.

According to some embodiments of the present invention, calculating comprises calculating the suitable combination based on calculating a plurality of cancellation weights, the cancellation weights correspond to frequency sub-bands that do not carry dominant interference signals are set to zero, so that a diversity scheme of the received signals is substantially preserved for performance of the diversity scheme in the receiver of a base station, and the expected change in the wireless channel of the received desired signal as measured by the base station in frequency sub-bands where there are no dominant interference signals is negligible.

According to some embodiments of the present invention, the method further comprises performing interference cancellation in the frequency domain, and filters are added with a frequency domain beam former module that multiplies frequency domain weights with output from bins of a Fast Fourier Transform (FFT) process for both inputs, adding the results together in the frequency domain bin based on prior Inverse Fast Fourier Transform (IFFT) and/or in time domain sample by sample after the IFFT process. Optionally, interference cancellation is performed in the frequency domain based on FFT, IFFT overlap and/or Save or Window Overlap filters.

According to some embodiments of the present invention, determining comprises tracking the interference signals to detect changes in the received interference signals, the suitable combination based on the detected changes.

According to some embodiments of the present invention, interference cancellation is applied during tracking of the received interference signals to avoid cancelling the desired signals when undesired interference signals are absent, the suitable combination based on avoiding cancellation of the desired signals.

According to some embodiments of the present invention, determining comprises determining when the power level of the interference signals is near or less than the power level of desired signals, the suitable combination based on the detected power level.

According to some embodiments of the present invention, the suitable combination is based on avoiding cancellation of a desired signal rather than interference signals.

According to some embodiments of the present invention, determining comprises determining by detecting time periods where desired signals are not received, and identifying the interference signals during the time periods.

According to some embodiments of the present invention, the time periods are guard intervals of communication protocols.

According to some embodiments of the present invention, determining comprises determining based on detecting received desired signals based on certain characteristics of the received desired signals.

According to some embodiments of the present invention, the method further comprises switching the received signals to interference cancellation or to diversity reception, based on the interference signal determination, the suitable combination comprising applying interference cancellation or diversity reception.

According to some embodiments of the present invention, the number of received antenna inputs is higher than the number of signal outputs to the receiver, wherein the number of interference signals is less than the number of antennas minus one, wherein there are sufficient degrees of freedom to perform the interference cancellation and to preserve the inherent diversity gain. Optionally, providing comprises providing to the receiver inputs signals with reduced cross correlation among each antenna input couple, so that diversity gain is achieved by providing to each receiver input different composite antenna array patterns through certain settings of beam former weights, wherein each receiver is connected to certain composite antenna array patterns with common nulls toward the interference signal direction and/or polarization, with a beam steered toward different direction and/or polarization of a base station cell geometry. Optionally, there are no interference signals present, and further comprising converting certain N number of antennas to M base station diversity inputs where M<N.

According to some embodiments of the present invention, determining the presence of a desired signal originating from the wireless communication network in the received signals is performed based on exploiting long term known statistic parameters of the desired signals.

According to an aspect of some embodiments of the present invention there is provided a method for switching between signal analysis modes within a receiver of a wireless communication network, comprising: using a plurality of antennas of a group of antennas for reception of signals in a diversity scheme; determining the presence of interference signals originating from at least one external transmitting source in the received signals; switching from using reception of at least two of the plurality of antennas for diversity scheme reception of the signals, to using reception of the at least two antennas for signal interference cancellation; determining a termination of the interference signals; and switching from using reception of said at least two antennas for signal interference cancellation to using reception of said at least two antennas for diversity scheme reception of said signals.

According to some embodiments of the present invention, switching comprises applying interference cancellation to some frequency sub-bands containing interference signals, and the antenna diversity in other sub-bands that do not contain dominant interference signals. Optionally, the antenna diversity scheme reception comprises preserving the received signals in a ready state for diversity scheme processing by a base station receiver.

According to some embodiments of the present invention, switching is independently performed for different frequency sub-bands of the received signals.

According to some embodiments of the present invention, the received signals are corrupted RF signals, and further comprising: converting the corrupted RF signals to corrupted baseband signals; applying baseband interference cancellation on the corrupted baseband signal to cancel undesired interference baseband signals and generate clean baseband signals; converting the clean baseband signals to clean RF signals at the same RF frequency of the received corrupted RF signals; and injecting the clean RF signals into an existing receiver unit.

According to some embodiments of the present invention, the antennas are arranged for polar diversity and the interference signals cancellation is based on the received interference signals having different polarity parameters than most or all of the received desired signals.

According to some embodiments of the present invention, the antennas are arranged for spatial diversity and the interference signals cancellation is based on the received interfering signals having a direction of arrival different than most or all of the received desired signals.

According to some embodiments of the present invention, the antennas are arranged for spatial and/or polar diversity, and further comprising: determining the presence of at least one additional interference signals, wherein the total number of determined interference signals is equal to the number of existing antennas; and deploying at least one additional directional antenna with a direction towards the additional interference signal, so that the additional interference signal is cancelled based on the additional direction antenna.

According to some embodiments of the present invention, interference cancellation is performed in the frequency domain separately for sub-bands and/or frequency bins containing interference signals, and diversity scheme reception is performed for sub-bands that do not contain interference signals.

According to some embodiments of the present invention, interference cancellation is applied to cancel a plurality of time concurrent interference signals from a plurality of external transmitting sources, wherein the external transmitting sources have a number of spectral components less than the number of the antennas in common frequency sub-bands and/or frequency bins.

According to some embodiments of the present invention, interference cancellation is applied to frequency sub-bands that contain interference signals and an original diversity scheme reception is maintained in frequency sub-bands that do not carry dominant interference signals.

According to some embodiments of the present invention, the number of concurrent interference signals in the same frequency sub-band is less than the number of antennas minus one, and both interference cancellation and diversity scheme reception are performed based on the desired signal that is received in the frequency sub-band.

According to some embodiments of the present invention, concurrent interference signals in the same frequency sub-bands are received with concurrent desired signals in the same frequency sub-bands, the received power of the interference signals being significantly higher than the received power of the desired signal, such that the cancellation weights calculated based on existence of interference and desired signal reject the output interference signal, and leave the desired signal provided to the base station substantially unaffected.

According to some embodiments of the present invention, the method further comprises forwarding the signals receiving during diversity scheme reception and cleaned signals received during interference cancellation to an existing receiving unit for forwarding within a data communication network.

According to some embodiments of the present invention, the method further comprises acquiring the received interference signals based on detecting dominant presence of undesired interference signals with less dominant presence of desired signals.

According to some embodiments of the present invention, the method further comprises tracking the interference signals to detect changes in the received interference signals.

According to some embodiments of the present invention, interference cancellation is applied during tracking of the received interference signals to avoid cancelling the desired signals when undesired interference signals are absent.

According to some embodiments of the present invention, determining comprises determining when the power level of the interference signals is near or less than the power level of desired signals.

According to some embodiments of the present invention, determining comprises determining to avoid cancellation of a desired signal rather than interference signals.

According to some embodiments of the present invention, determining comprises determining by detecting time periods where desired signals are not received, and identifying the interference signals during the time periods. Optionally, the time periods are pre-selected intentional muting time periods to ensure correct determination. Alternatively or additionally, the time periods are guard intervals of communication protocols.

According to some embodiments of the present invention, determining comprises detecting received desired signals based on certain characteristics of the received desired signals.

According to some embodiments of the present invention, the method further comprises injecting synthetic correlated noise signals into each received desired signals antenna input, the number of injected correlated noise signals being equal to the number of antennas, the synthetic noise generated to prevent suppression of received desired signals when a number of transmitting client transceivers is lower than the number of antennas.

According to some embodiments of the present invention, the interference signal is temporary and/or intermittent.

According to some embodiments of the present invention, signal interference cancellation comprises calculating a plurality of cancellation weights. Optionally, the cancellation weights that correspond to frequency sub-bands that do not carry dominant interference signals are set to zero, so that the diversity scheme of the received signals is substantially preserved for performance of the diversity scheme in a base station and the expected change in the wireless channel of the received desired signal as measured by the base station in frequency sub-bands where there are no dominant interference signals is negligible.

According to some embodiments of the present invention, the interference cancellation is performed in the frequency domain, and filters are added with a frequency domain beam former module that multiplies frequency domain weights with output from bins of a Fast Fourier Transform (FFT) process for both inputs, adding the results together in the frequency domain bin prior to processing an Inverse Fast Fourier Transform (IFFT) and/or in time domain sample by sample after the IFFT process. Optionally, interference cancellation is performed in the frequency domain based on FFT, IFFT overlap and/or Save or Window Overlap filters.

According to an aspect of some embodiments of the present invention there is provided a system for switching between signal analysis modes within a receiver of a wireless communication network, comprising: a plurality of existing antennas for receiving wireless signals from a plurality of client transceivers, the plurality of antenna arranged for an antenna diversity scheme; a hardware processor; and a non-transitory memory having stored thereon program modules for instruction execution by the hardware processor, comprising: a switching decision module for determining the presence of an interference signal originating from an external transmitting source in the received signals, and for determining a termination of the interference signal; and one or more switch modules for directing the received signals to interference cancellation or to diversity reception, based on the switching module determination.

According to some embodiments of the present invention, the system further comprises a module for baseband signal interference cancellation, the module having instruction for converting received corrupted RF signals to corrupted baseband signals;

applying baseband interference cancellation on the corrupted baseband signal to cancel undesired interference baseband signals and generate clean baseband signals; and converting the clean baseband signals to clean RF signals at the same RF frequency of the received corrupted RF signals.

According to some embodiments of the present invention, the system further comprises receiving circuitry in electrical communication with the antennas, with the hardware processor and with a data communication network, the receiving circuitry processing signals for at least one of transmit and receive between the plurality of antennas and the data communication network.

According to some embodiments of the present invention, the system further comprises at least one antenna in addition to the plurality of existing antennas, the at least one antenna added for interference cancellation of undesired signals and maintenance of existing antenna diversity.

According to some embodiments of the present invention, a number of the additional antennas is selected according to a number of simultaneous interference signal channels so that a total number of antennas is equal to or more than the number of simultaneous interference channels.

According to some embodiments of the present invention, at least one separate antenna port is used for each of transmitting and receiving wireless signals, and an interference cancellation unit is arranged between the receiving antennas and receiving circuitry along an uplink path.

According to some embodiments of the present invention, the same antenna port is used for transmitting and receiving RF signals, wherein the switch modules are in electrical communication between the antennas and an interference cancellation unit, and between the interference cancellation unit and receiving circuitry, the switch modules programmed to direct signals on an uplink path through the interference cancellation unit, and to direct signals on a downlink path to bypass the interference cancellation unit.

According to some embodiments of the present invention, at least one of the switch modules is a duplexing filter for the system operating with Frequency-division duplexing, or a switch for the system operating with time-division duplexing.

According to some embodiments of the present invention, the system further comprises a remote radio head (RRH) located remotely from the hardware processor, the RRH communicating with the hardware processor using wired links transmitting digital signals, and a module stored on the memory containing program instruction for receiving digital baseband signals from the RRH, performing interference cancellation on the received digital baseband signals to generate a clean digital baseband signals, and transmitting the clean digital baseband signals over the wired link to the hardware processor.

According to some embodiments of the present invention, the hardware processor, the non-transitory memory, and the switching module are integrated into an interference cancellation unit that is a stand-alone device.

According to some embodiments of the present invention, the hardware processor, the non-transitory memory, and the switching module are disposed within an existing housing.

According to some embodiments of the present invention, the system further comprises a synchronization mechanism for coordination between receiving circuitry and the switching module for communication of time periods when there is no reception of desired signals, and wherein the switching module detects the interference signals based on the time periods.

According to some embodiments of the present invention, the system further comprises a module for calculating interference cancellation weights for cancelling the interference signals.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings:

FIG. 3 is a schematic block diagram of an add-on interference cancellation function (ICF) unit coupled to an existing base station, in accordance with some embodiments of the present invention;

FIG. 4A is a schematic block diagram of an add-on interference cancellation function unit for coupling to an existing base station, in accordance with some embodiments of the present invention;

FIG. 4B is a schematic illustration of the add-on ICF unit of FIG. 4A, in accordance with some embodiments of the present invention;

Figure 1:
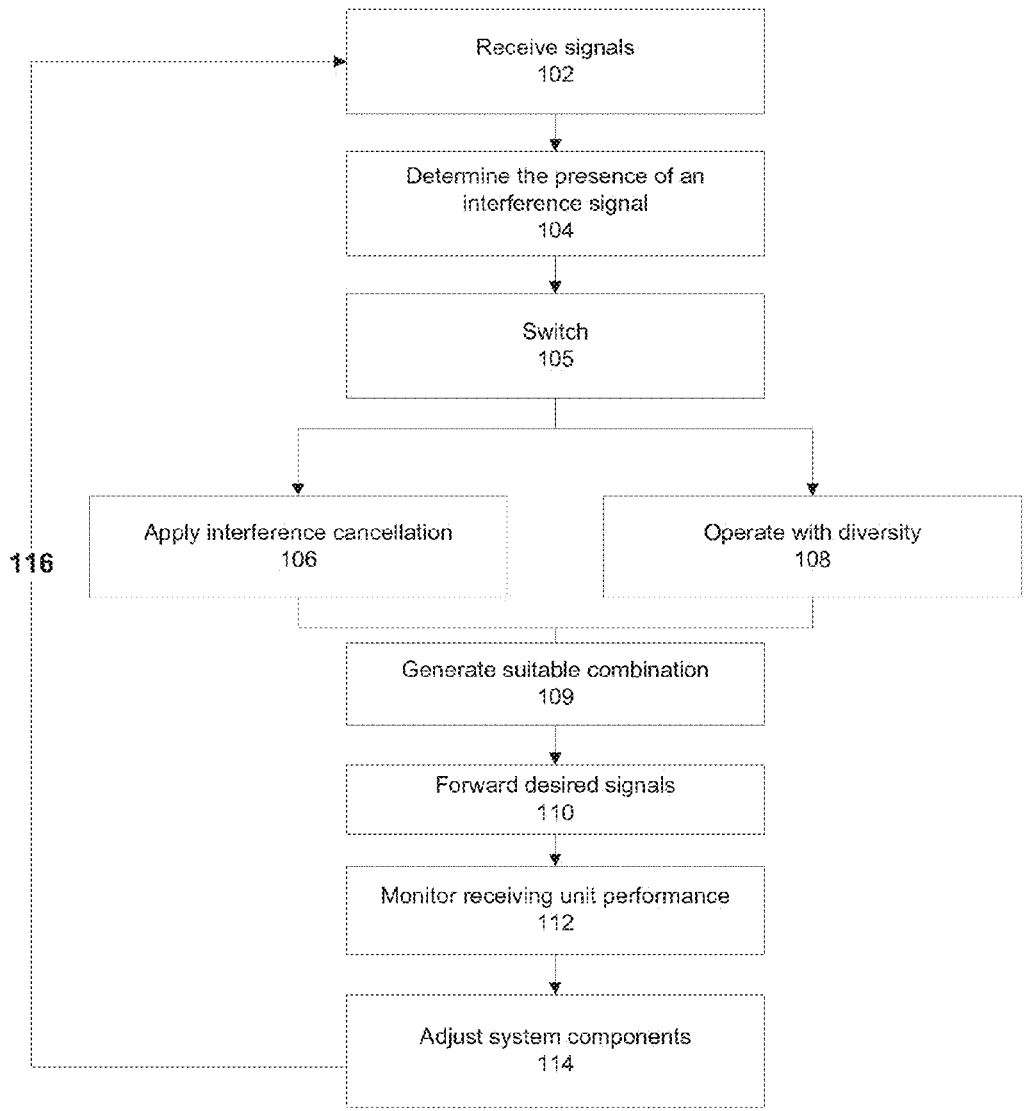
FIG. 1 is a flowchart of a method for cancelling interference, in accordance with some embodiments of the present invention.

DESCRIPTION OF SPECIFIC EMBODIMENTS
OF THE PRESENT INVENTION

The present invention, in some embodiments thereof, relates to data communication networks and, more particularly, but not exclusively, to systems and methods for cancellation of interference signals transmitted by interference transmitters.

As used herein, the phrase interference cancellation means removal and/or reduction of interference signals and/or other undesired signals from received signals. Desired signals may be isolated. Cancellation and/or removal may not be complete. Noise and/or the undesired signals may remain at a reduced level that allows for identification and/or detection of the desired signal. Sometimes as used herein, the presence of the interference signals means the presence of a dominant interference signal, and/or the absence of the interference signals means the absence of the dominant interference signal. The dominant interference signal may refer to a level of interference that requires cancellation, for example, the interference is not tolerable and/or reduces efficiency of the system. Dominant interference is sometimes used to refer to calculation of cancellation weights based on the dominant interference signal. The cancelation of the interference signal using the calculated weights may be optimal, even though the less dominant desired signal exists during the weight calculation. The interference cancellation may reduce the level of interference, for example, below a predefined receiver noise threshold level. A corrupted signal (composed from desired signals with interference from interference signals) may undergo interference cancellation to generate a clean signal (composed from desired signals).

As used herein, the term antenna sometimes means the port of the antenna.

An aspect of some embodiments of the present invention relates to a module for calculating a suitable combination of received signals, where the effect induced by the interference signal is reduced (e.g., minimized) and the impact of the interference cancellation on the desired signals is reduced (e.g., minimized). The minimization of the interference signals and the impact of the desired signals may be based on an optimization trade-off, where improvement in one reduces the improvement in the other. Optionally, the optimization is performed to reduce both the interference signals and the impact on the desired signals.

The module may be, for example, a self contained add-on unit, a card to be plugged into the base station, a software module, or other hardware and/or software structures. Optionally, the module complements a receiver of a wireless network.

Optionally, the module is designed for coupling to an existing base station receiver of a wireless communication network, for example, as a standalone device that is plugged in between the existing antennas and the existing receiver.

Optionally, the receiver module operates externally to the receiver of the wireless network and the plurality of antennas. Optionally, the receiver module operates independently of the wireless network, receiver, end clients, antennas and/or other components. Optionally, the module operates blindly on the received signals. Optionally, the module determines the presence of the interference signal based on the received signals without additional information from the wireless network. Alternatively or additionally, the module determines the presence of the desired signal based on the received signals without additional information from the wireless network. Alternatively or additionally, the module calculates the suitable combination without additional information from the wireless network. Examples of without additional information include: controlling transmission of signals within the wireless communication network, requesting transmission of special signals, muting the wireless communication network, and polling elements within the wireless communication network, exploiting instantaneous signature within the desired signals (e.g., exploiting one or more of: pilot signals, preamble signals, sounding signals within the desired signals, long term known statistic parameters of the desired signals). The module may operate without having additional knowledge of the state of the signals and/or without the ability to control signals within the network. The module may operate only based on the received signals.

Optionally, the module has functionality to identify the presence of the interference signals and/or the desired signals within the received signals. Optionally, the detection is performed independently of the receiver. The add-on unit may be installed with relatively little configuration, as signal identification may be performed within the add-on unit without requiring special configuration and/or specific details from the receiver or the network. In some cases, limited information may be provided from the receiver and/or network to help with the identification. Identification may be performed by one or methods described herein in more detail, for example, tracking the interference signals, detect muted time periods, detect characteristics of known desired signals, and/or other methods.

Optionally, the module has functionality to preserve the desired signals. Optionally, cancellation of desired signals (rather than cancellation of interference signals) is reduced and/or avoided. Optionally, the power level of the interference signal relative to the power level of the desired signals is determined, and the combination calculated appropriately based on the relative power levels. Alternatively or additionally, interference cancellation is applied during the presence of the interference signals. Cancellation of the desired signal may be prevented or reduced in this manner. Alternatively or additionally, synthetic noise is injected as part of the combination, the synthetic noise generated to reduce or prevent suppression of the received desired signals. Synthetic noise may be generated based on preselected rules, for example, when the number of transmitting clients (e.g., phones) is less than the number of antennas.

Optionally, the module switches between interference cancellation mode and antenna diversity mode (e.g., transparent mode, bypass mode) to generate the suitable combination. Optionally, desired signals in frequency sub-bands (or the entire spectrum) are substantially preserved for the receiver to perform the antenna diversity scheme operation, when the interference signal is absent.

Optionally, the combination is calculated based on predefined calculation methods for calculation of interference weights based on different conditions, for example, based on relative power level between the interference signal and the received signal, based on the existence of multiple concurrent interference signals and/or multiple concurrent desired signals, and/or based on the absence of interference signals.

An aspect of some embodiments of the present invention relates to systems and/or methods for using the same set of antennas interchangeably, for both reception in diversity scheme reception, and for interference cancellation. Optionally, switching between diversity mode and interference cancellation mode is performed automatically and/or dynamically. Optionally, the switching is based on the presence or absence of an interference signal originating from an external transmitting source, in the received signals. Optionally, the switching is based on the termination of the interference signal.

Optionally, switching is performed when the interference signal occupies parts (e.g., sub-bands) of the desired signal bandwidth. Optionally, the interference cancellation is performed on the portions of the received signal bandwidth that contain interference signals, and the diversity mode is performed on the portions of the received bandwidth that do not contain interference signals. There may be sufficient degrees of freedom (i.e., the number of interference signals is less than the maximum number of antennas minus one) to conduct both the interference cancellation and diversity operation modes on the bandwidth, optionally the portion of the bandwidth that contains interference signals. Optionally, both interference cancellation and diversity operation are performed independently on the sub-bands. Optionally, both interference cancellation and diversity operation are performed simultaneously on the sub-bands.

Optionally, several concurrent interference signals from different sources are cancelled. Optionally, interference cancellation is performed when in each (or some) affected sub-bands the number of dominant interference signals is less than the number of antennas minus one (optionally, some sub-bands do not contain interference signals, and/or contain less interference signals than the number of antennas minus one). In this manner, the total number of interference signals in the entire band (or in some of the sub-bands) may be more than the number of antennas minus one. Optionally, interference cancellation is performed on all (or some) of these interference signals within the different sub-bands.

Optionally, several concurrent interference signals within the same frequency sub-band are cancelled, by applying interference cancellation to the affected sub-bands and diversity operation to the non-affected sub-bands. Optionally, the number of different interference signals in each sub-band is less than the number of antennas minus one.

Optionally, the switching method allows for a reduction in a total number of antennas. The same set of antennas may be used for interference cancellation and diversity reception, instead of different antennas for interference cancellation and another set of different antennas for diversity reception.

Optionally, the switching method may allow for cancellation of intermittent interfering sources, temporary interfering sources, and/or variation in the number of interfering sources, without installing additional permanent antennas. The existing antennas may be used to cancel interference from interference signals that are occasionally received.

Optionally, the switching method is applied to existing receiving units, for example, receiving units that are operating to provide communication services. The existing units may have been designed and/or optimized according to their network environment. Optionally, performance of the existing units and/or overall system performed is improved, as the existing units with multiple antennas are used in the most effective way, and may improve available bandwidth, capacity, utilization of network resources, quality of data transfers, and/or other system parameters. Network equipment may be protected from interference, in addition to utilizing the existing diversity architecture. When interference is present, the multiple antennas may be used to cancel the interference. When interference is absent, the multiple antennas may be used with the existing antennas diversity to improve the quality and/or reliability of the wireless links.

Interference may be cancelled from narrowband and/or broadband interferers. Interference from multiple interferers (time and/or frequency) across the protected receive spectrum may be cancelled.

It is noted that the number of interference signals that may be cancelled with the same time and frequency stamp may be limited by the number of antennas. The maximum number of interference signals that may be cancelled is less than or equal to the number of antennas minus one. When the number of interference signals is below the number of antennas minus one, there is sufficient number of degrees of freedom to accommodate both interference cancellation and a certain desired signal diversity.

Optionally, the switching is applied so that the interference cancellation and the antenna diversity are simultaneously performed. Optionally, interference cancellation is applied to frequency bands having significant interference signals (e.g., transmitted by a narrow band interferer). Optionally, the antenna diversity is maintained for other frequency bands without the significant interference signals.

The existing receiving units may be operating within an existing network to provide data communication services. The switching method is applied to provide interference cancellation functionality to the existing network using the existing antenna structural arrangement.

Optionally, received signals are differentiated into corrupted signals (which include interference of desired signals) and non-corrupted signals (which do not include significant interference of desired signals).

Optionally, the presence of interference signals is acquired and/or tracked. Optionally, the interference cancellation is dynamically applied to corrupted signals based on the tracking, when interfering signals interfere with desired signals. Optionally, the interference cancellation is dynamically bypassed based on the tracking, where interfering signals are absent and/or do not interfere with desired signals.

Optionally, acquiring the received interference signals is based on detecting the dominant presence of undesired interference signals with less dominant presence of desired signals.

Optionally, the interference cancellation is not applied when the interfering signals are absent and/or do not interfere with desired signals. Cancellation of desired signals may be avoided.

Optionally, synthetic noise signals are injected into the received desired signals. Optionally, synthetic noise signals are injected in a manner that it will have high cross correlation among the cancellation inputs (antenna inputs). Optionally, the synthetic noise injection is performed when the number of transmitting client transceivers is less than the number of antennas. The synthetic noise injection may prevent suppression of the received desired signals, for example, by consumption of all the available degrees of freedom.

Optionally, the switching method and/or system is implemented within an existing receiving unit of a wireless data communication network. Optionally, the implemented switching method is transparent to the existing receiving unit. For example, software is loaded to network processors and/or an external unit is connected to existing equipment. Optionally, clean signals obtained from corrupted signals by the interference cancellation are injected into a component of the receiving unit for forwarding within the data communication network. Optionally, the existing receiving unit includes multiple antennas arranged for existing antenna diversity, for example, designed according to existing network conditions.

Optionally, corrupted radiofrequency (RF) signals received from the antennas are converted into corrupted baseband signals for interference cancellation. Optionally, the clean baseband signals are converted back into RF signals at the same frequency as the received corrupted signals. The clean RF signals are optionally injected into the existing receiving unit for further processing and/or forwarding within the data communication network. In this manner, the interference cancellation may be transparent to the existing receiving unit. Alternatively, the received corrupted signals are already in baseband form.

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

Referring now to the drawings, FIG. 1 is a flow chart of a method for switching received signal processing modes between interference cancellation and receiver diversity mode, in accordance with some embodiments of the present invention.

Figure 2:
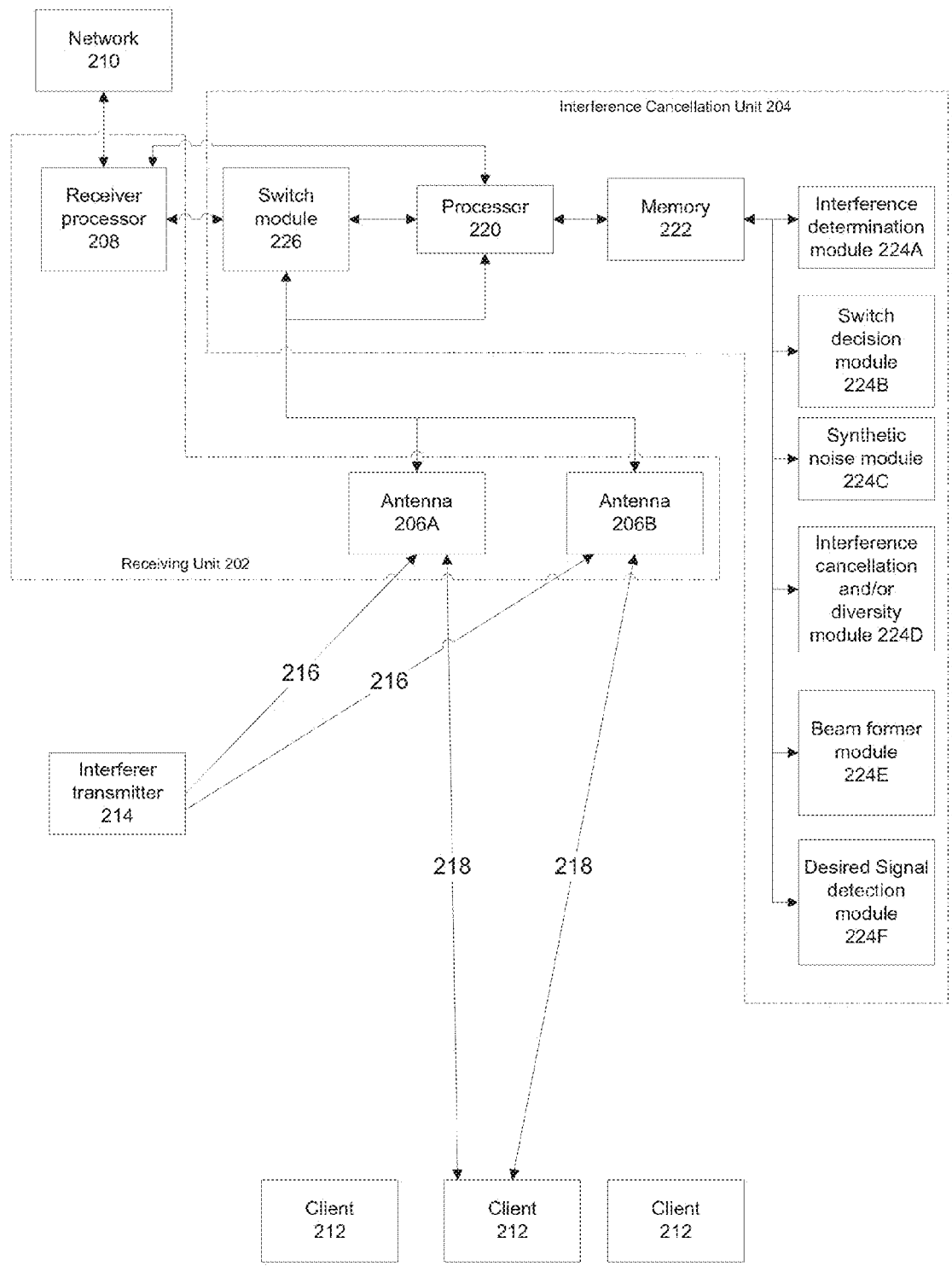
FIG. 2 is a schematic block diagram of an exemplary receiving unit communicating with an interference cancellation unit for cancelling interference, in accordance with some embodiments of the present invention.

Reference is also made to FIG. 2, which is a block diagram of a network receiving unit 202 for receiving wireless signals, coupled to an interference cancellation unit 204 for cancelling interference signals, interference cancellation unit 204 having an optional switch module 226 for selective application of the interference cancellation mode, in accordance with some embodiments of the present invention. The switch may be software only (e.g., an algorithm with an embedded switch-like function. The software switch may perform cancellation on the part of the spectrum with interference and maintain diversity gain on the part of the spectrum without interference), hardware only, and/or a combination of software and hardware. Interference cancellation unit 204 is designed to cancel interference signals while retaining at least some receiver diversity functionality of receiving unit 202.

Optionally, interference cancellation unit 204 has a first interface for electrically coupling (e.g., by plugging of a cable) to antennas. Optionally, desired signals and/or interference signals are received on the first interface. Optionally, unit 204 has a second interface for electrically coupling (e.g., by plugging in a cable) to a receiver of a wireless communication network. Optionally, signals processed by unit 204 are provided to the receiver by the second interface. Optionally, unit 204 is an add-on unit arranged as a self-contained structure for coupling to both the wireless network and the antennas.

It is noted that FIG. 2 is a simplified high level conceptual diagram. Additional implementation designs and/or details are described herein, for example, with reference to FIGS. 3-10.

Optionally, interference cancellation unit 204 is switched between different modes interference cancellation mode and by-pass mode (i.e., no interference cancellation applied) based on the presence or absence of interference signals within the received signals.

Switching may be performed between one or more of the following modes of operation:

Bypass mode—interference cancellation unit 204 is bypassed. Signals received by antennas 206A-B may be directly forwarded to the receiver (e.g., as existed before installation of the interference cancellation unit). Bypass mode may be selected, for example, upon detected malfunction of the interference cancellation unit, and/or detection (or preexisting knowledge) that no interference signals are expected.

Transparent mode—interference cancellation unit 204 is active but does not cancel interference signals. Signals received by antennas 206A-B pass through the interference cancellation unit 204 on the path to the receiving unit 202 and/or the receiver processor 208. Optionally, signals are not processed by the interference cancellation unit. Alternatively, some processing is performed on the signals, for example, addition of delay. Transparent mode may be selected, for example, when both received desired signals and interference signals are present, with the interference signal level not being dominant and/or significant enough to require cancellation. In another example, transparent mode is selected if cancellation weight calculation is expected to provide erroneous results. In transparent mode, the diversity feature of both received signal inputs (from antennas 206A-B) may be preserved, so that the outputs of unit 204 are in a ready state for diversity scheme that may be conducted at the base station receiver (e.g., processor 208).

Cancellation mode—interference cancellation unit 204 is active and performs interference cancellation. Cancellation mode may be selected, for example, upon detection of dominant interference signals. Optionally, where there are frequency sub-bands that have a number of dominant interference signals that is less than the number of antennas minus one, the output of the cancelation unit may be provided with reduced interference signal power and/or in the diversity ready state for the base station receiver, for the respective frequency sub-bands.

Optionally, cancellation mode and transparent mode are performed simultaneously on the received signal. Optionally, different sub-bands of the received signal are processed in cancellation mode or transparent mode. Optionally, the cancellation mode is performed for sub-bands with interference signals. Optionally, transparent mode is performed for sub-bands without interference signals.

Installation of interference cancellation unit 204 may improve performance of receiving unit 202 by adding additional interference cancellation functionality in addition to the existing antenna receiver diversity functionality.

Optionally, receiving units 202 are base-stations, access point receivers, or other components within a data communication network, for example, a wireless data communication network. Receiving units 202 may be part of any suitable wireless network, for example, WCDMA, LTE, WiFi, WiMax, or other technologies. Receiving units 202 have antennas 206A-B to receive wireless transmissions transmitted from one or more clients 212, for example, mobile phones, Smartphones, laptops, tablets, mobile devices, other receiving units, and/or other transceivers. The received signals are processed by a receiver processor 208, which is optionally connected to a data communication network 210. The processed received signals may be forwarded over network 210.

Receiving units 202 may operate within licensed frequency bands, and/or may operate within unlicensed spectrums.

Optionally, receiving units 202 have multiple antennas 206A-B arranged for antenna diversity. The receiving diversity may be designed for link robustness and/or quality. Alternatively or additionally, one or more additional antennas may be added to existing antennas, for example, to provide diversity functionality, to provide cancellation functionality, and/or to increase the number of interfering channels that may be cancelled.

A foreign interferer transmitter 214 may transmit undesired interference signals 216 that interfere with desired signals 218 transmitted by clients 212. There may be multiple interferer transmitters 214 that may transmit on multiple interfering channels.

Examples of interferer transmitters 214 include: jamming equipment (for intentional jamming of communication networks), remote broadcasting equipment (e.g., television, radio) that have harmonic components transmitting on overlapping or adjacent frequencies, other sites of the same network (e.g., TDD network), other sides of different networks (e.g., TDD networks using different technologies), unauthorized usage of transmitting equipment on the overlapping or adjacent frequencies, and/or other transmitters transmitting on overlapping and/or adjacent frequencies.

Interferer transmitter 214 may be narrowband or wideband.

Interference cancellation unit 204 is in electrical communication with receiving unit 202. One or more switch modules 226 (e.g., duplexers, switches, software implemented), direct received signals from antennas 206A-B into interference cancellation unit 204, or to by-pass interference cancellation unit 204 (optionally directly into receiver unit 208). Switch modules 226 may be integrated within interference cancellation unit 204, may be a self-contained unit, and/or may be integrated within receiving unit 202.

Different installations may be performed, for example, depending on the implementation of receiving unit 202 (e.g., base-station, access point). Installation cancellation unit 204 may be a standalone unit (e.g., connected by cables), embedded into receiving unit 202 (e.g., card inserted into slot of receiver processor 208), and/or software (e.g., loaded onto a memory).

The structure of interference cancellation unit 204 may be based on the desired installation configuration. For example, the standalone unit may contain a processor 220, and a non-transitory memory 222 having multiple stored modules 224 with instructions for execution by processor 220. The standalone unit may be encased in a housing. The embedded configuration may not have the housing, with the processor 220 and memory 222 on a card. The software version may comprise of a computer program product having instructions for execution by a processor of the network, for example, the receiving processor. Alternatively or additionally, interference cancellation unit 204 is implemented (entirely or in part) based on firmware of programmable hardware devices, for example, field-programmable gate array (FPGA), application-specific integrated circuit (ASIC), or other hardware.

Optionally, interference cancellation unit 204 is connected along the received signal path from antennas 206A-B to receiver processor 208 (e.g., baseband receiver), between antennas 206A-B and processor 208 (e.g., baseband receiver). For example, interference cancellation unit 204 is connected in front of a RF receiving section of a base station, or in front of digital receiver baseband ports. In another example, interference cancellation unit 204 is embedded into a baseband module.

Optionally, one or more filtering and/or amplification elements (e.g., hardware and/or software) are positioned in electrical communication between antennas 206A-B and interference cancellation unit 204. Alternatively or additionally, one or more filtering and/or amplification elements are positioned in electrical communication between interference cancellation unit 204 and receiver processor 208. Examples of filters include duplexers. Examples of amplifiers include tower mounted amplifiers.

Figure 10:
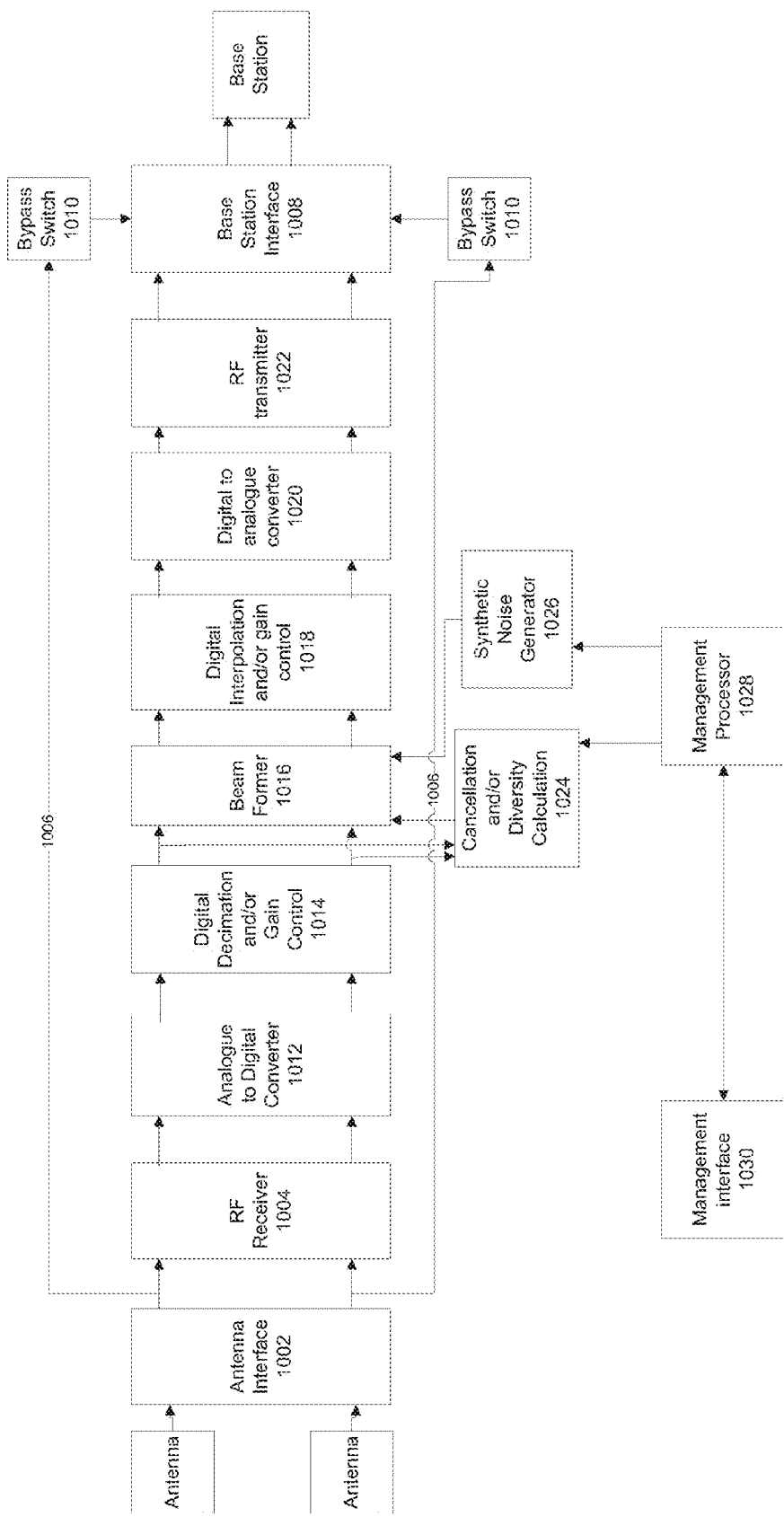
FIG. 10 is yet another top level block diagram of an exemplary implementation of an interference cancellation unit, in accordance with some embodiments of the present invention.

Reference is now made to FIG. 10, which is a block diagram of an exemplary implementation of an interference cancellation unit 1000, in accordance with some embodiments of the present invention. Interference cancellation unit 1000 may contain additional features and/or implementation details, for example, as compared to FIG. 2 and/or other figures described herein. Unit 1000 may implement the method of FIG. 1. Modules of unit 1000 may be implemented in software, hardware, and/or a combination of hardware and software.

Signals from antenna interface 1002 are received by an RF receiver 1004. Optionally, the received signals bypass interference cancellation unit 1000 to base station interface 1008, through a by-pass signal path 1006. An optional switch 1010 selectively directs signals through by-pass signal path 1006 or into unit 1000.

Alternatively, received signals are directed into unit 1000. Optionally, the received signals are converted into digital form by an analogue to digital converter module 1012. Optionally, signals are further processed by a digital decimation and/or gain control module 1014. Optionally, signals are further processed by a frequency domain (FD) beam former module 1016, for example, by applying Fast Fourier Transform (FFT), and/or Overlap and Save (OLAS), and/or Window Overlap and Add (WOLA) filters. Module 1016 may also be a spatial polar filter. Optionally, module 1016 adds frequency domain cancellation weights (optionally received from a cancellation and/or diversity calculator module 1024) to the received signals. Alternatively or additionally, module 1016 adds injected noise to the received signals (e.g., from a synthetic noise module 1026). Optionally, signals are further processed by a digital interpolator and/or gain control module 1018. Optionally, signals are converted back to analogue form by a digital to analogue converter module 1020. Optionally, signals are provided to the base station by an RF transmitter 1022, through base station interface 1008.

Optionally, cancellation and/or diversity calculation module 1024 performs interference cancellation and/or diversity scheme (e.g., to process the output signals into diversity ready state for the base station receiver) operation mode, for example, as described herein. Optionally, module 1024 processes signals received from digital decimation and/or gain control module 1014. Optionally, module 1024 provides post-processed signals to FD beam former module 1016.

Optionally, synthetic noise is generated by synthetic noise source 1026. Optionally, frequency domain synthetic noise is injected into FD beam former 1016. Additional details of synthetic noise injection are provided herein.

Optionally, a processor 1028 controls the function of one or more modules of unit 1000.

Optionally, a management interface 1030 provides an interface to a user for performing control, monitoring, programming, and/or other functions on unit 1000.

Attention is now diverted to FIG. 3, which is a schematic block diagram of an add-on interference cancellation function (ICF) unit 304 coupled to an existing base station 302, in accordance with some embodiments of the present invention. FIG. 3 is an exemplary implementation based on FIG. 2. Optionally, ICF unit 304 is installed for base-station 302 having separate ports for transmission (Tx) 346 and reception (Rx) 348 of a base station transceiver 308. Alternatively or additionally, ICF unit 304 is installed for base-station having common ports for transmission (Tx) and reception (Rx).

Optionally, ICF unit 304 is coupled within the signal receive path, between antennas 306A-B and base station transceiver 308.

Optionally, ICF unit 304 is a standalone unit.

Optionally, ICF unit 304 includes an ICF RF receive module 350 for receiving RF signals from antennas 306A-B, and converting the received RF signals to baseband received signals. The received RF signals may be corrupted signals. A baseband ICF module 352 applies interference cancellation to the received signals to generate clean baseband signals. An optional ICF RF transmit module 354 coverts (e.g., interpolates, and/or remodulates, and/or up-converts) the clean signals back to the same RF they were received. Optionally, the clean remodulated RF signals are injected into base station receiver 348.

Optionally, signals transmitted from base station transceiver 308 to antennas 306A-B are directed to bypass ICF unit 304 by an optional switch element, for example, duplexers 356A-B. Interference cancellation may be applied to received signals, but not to signals for transmission. Signal path 360 denotes the by-pass path, between duplexers 356A-B, to bypass ICF unit 304 on the path from antennas 306A-B to base station transceiver 308.

In this manner, ICF unit 304 may be seamlessly integrated with base station receiver 348, which may allow transparent operation that may not affect base-station operation. ICF unit 304 may be installed simply within base station 302, for example, as an add-on to existing base-station 302.

It is noted that the functions of modules 350, 352 and/or 354 may be integrated with interference cancellation unit 204 of FIG. 2. Interference cancellation unit 204 may convert RF signals to baseband, apply interference cancellation and optionally convert back to RF before providing the signal to receiver processor 208.

Alternatively, interference cancellation unit 204, ICF 404 of FIGS. 4A and/or 4B, and/or other embodiments as described herein may be implemented without modules to convert between RF and baseband. Optionally, received signals are baseband (optionally digital) signals, for example, received from a remote radio head (RRH). The RRH may be located remotely from the base station. The RRH may perform the conversion of received RF signals to the digital baseband waveform format. The digital baseband signals may be transmitted to the base station, for example, over fiber links. In this case, the interference cancellation may be applied on the digital baseband signals directly to generate clean digital baseband signals. The clean digital baseband signals may be passed over the fiber to the base station equipment. The interference cancellation unit may be implemented between the base-station and the RRH, for example, within the base station, within the RRH, or at another in-between location.

Attention is now diverted to FIG. 4A, which is a schematic block diagram of an add-on interference cancellation function (ICF) unit 404 for coupling to an existing base station, in accordance with some embodiments of the present invention. FIG. 4A is an exemplary implementation based on FIG. 2 and/or based on FIG. 3.

Optionally, ICF unit 404 is installed for systems where received signals are baseband digital signals.

Optionally, ICF unit 404 is a stand-alone device, for example, as illustrated in FIG. 4B, which is a schematic illustration of ICF unit 404 of FIG. 4A, in accordance with some embodiments of the present invention.

Optionally, ICF unit 404 includes a cancellation unit 456 to handle the interference cancellation and/or diversity mode.

Optionally, embedding the interference cancellation unit (204, 304, 404, or other embodiments described herein) within the receiving unit (e.g., base station) may simplify the implementation, as the signal may not need to be regenerated after the interference cancellation is applied. The signal may not need to be converted to RF, and/or passed over fibers. Optionally, the implementation may be compact, an additional device may not be required, for example, the interference cancellation unit is installed as software and/or as an add-on card. Optionally, the embedding may provide communication links between the base-station receiver and the interference cancellation unit, to provide the status of the received desired signal to improve interference acquisition and/or tracking performance, as described herein.

Referring now back to FIGS. 1 and 2, optionally, at 102, signals are received by two or more of antennas 206A-B. Optionally, signals are corrupted signals, composed of desired signals with interference signals. The signals are received by multiple existing antennas 206A-B, which are arranged for diversity. Optionally, the applied interference cancellation is based on the existing antenna diversity arrangement.

The antennas are arranged for diversity, for example, spatial, polar, directional or other diversity arrangements. Separation between the interference and desired signals may be based on the diversity arrangement:

In one example, interference cancellation is based on polar diversity (e.g., using cross polarized receive antennas). It may be assumed that the interferer is static and the interference has a single polarity that is cancelled by the applied interference cancellation. Desired signals received from multiple clients may have, for example, random, rapidly changing arbitrary elliptical polarization.

Optionally, interference cancellation is based on polar diversity, and the interference signals cancellation is based on the received interference signals having different polarity parameters (e.g., elliptic, linear, and/or circular) than most or all of the received desired signals.

In another example, interference cancellation is based on spatial diversity. The antennas arranged for spatial diversity may be arranged to have about 100% overlapping radiation patterns. The antennas are spaced apart with a selected spacing to reduce reception correlation at one or both (or some, or all) antenna ports. The reduction in reception correlation may be exploited to achieve the diversity gain. Optionally, the system may adaptively steer the null in the compose antenna array pattern towards the direction of the interference source. For example, in the case of interference carried by a tropospheric duct, or received from a source which is installed at relatively high elevation, one antenna may be tilted (mechanically and/or electrically) above the horizon towards the interferer, while the rest of the antennas may be tilted below the horizon, towards the ground (where the clients are located). This arrangement may result in improved cancellation of the interference signals. Alternatively or additionally, another directional antenna is added. The additional antenna may be pointed towards the direction of the interference source. The additional antenna may improve the cancellation of the interference signal towards the base station receiver. The additional antenna may improve dominance in the reception of the interfering signal over the desired signal. This dominance may assist in performing more optimal calculations of the cancellation weights.

Optionally, the antennas are arranged for spatial diversity, and the interference signals cancellation is based on the received interfering signals having a direction of arrival different than most or all of the received desired signals.

In yet another example, in the case of interference that is carried by tropospheric ducts, the polarization of the received interference may be assumed to be mostly horizontal. The polar diversity antenna configuration at the protected site may enable the applied interference cancellation to cancel multiple duct interferers simultaneously, for example, when all interferer's contributions converge to a common horizontal polarization.

Optionally, at 104, the presence of an interference signal originating from an external transmitting source in the received signals is determined, for example, by an interference determination module 224A. Alternatively or additionally, the termination of the interference signal is determined.

Optionally, there are multiple interference signals originating from multiple external interfering sources. Detection of the presence or termination of the interfering signals may be performed independently for each interfering signal and/or channel.

Optionally, received interference signals are identified based on differentiating between received corrupted signals and received uncorrupted signals. The corrupted signals are composed of desired signals transmitted by client transceivers 212 with significant interference from undesired interference signals transmitted by interference transmitter 214. For example, the level of interference is above a predefined threshold. The uncorrupted signals are desired signals without any interference, or without significant interference from the undesired interference signals, for example, below the threshold.

Alternatively or additionally, the received signals are identified based on differentiating between received interference only (i.e., without desired signals) and received desired signals with interference (e.g., corrupted signals), for example, as described below.

Alternatively or additionally, the received signals are identified based on differentiating between received interference (i.e., without significant desired signals) and received desired (i.e., without significant interference), for example, as described below.

The degree of receiver diversity for the interfered receiver may be reduced during application of interference cancellation, optionally on the part of the signal spectrum that is corrupted by the interference. The multiplicity of antennas may be used for interference cancellation instead of diversity. Optionally, there are a sufficient number of antennas to accommodate both interference cancellation and diversity mode operation in the interference corrupted sub-band. Optionally, performing the interference cancellation in the frequency domain, may allow for determining the presence of the interference signal in the part of the received frequency band. Based on the detected interference presence, selective activation of interference cancellation mode may be performed in the part of the band where dominant interference signals were detected, and/or activation of transparent mode in the part of the signal band where no dominant interference signals were detected. This partial transparent mode may preserve (at least in part) the diversity mode that would have been available without application of the interference cancellation. Preserving the diversity mode may sometimes mean that the base station receiver is able to perform a suitable diversity scheme to achieve diversity gain. In the transparent sub-band, interference cancellation may not be applied, instead diversity may be preserved. The selective activation of modes and/or transition between modes, may enable the site receiver to gain from full receiver diversity (e.g., based on existing design) when there is no interference present (totally or partially), and to be protected from interference, for example, when the level of interference passes the predefined threshold in the received sub-band or full frequency band.

Optionally the number of antenna inputs into to the cancellation unit is higher than the number of inputs from the cancellation unit into to the base station receiver. When the number of interference signals (e.g., from different sources) is less than the number of antennas minus one, and there are sufficient degrees of freedom to perform the interference cancellation and to preserve the inherent diversity gain, the cancellation unit may provide to the base station receiver inputs signals with reduced cross correlation among each antenna input couple. The diversity may be achieved by providing to each base station receiver input different composite antenna array patterns through certain settings of the beam former weights (e.g., beam former module). Each base station receiver may be connected to certain composite antenna array patterns with common nulls toward the interference signals direction and/or polarization, and beam steered toward (e.g., maximally steered) different direction and/or polarization of the base station cell geometry.

A particular case may arise when there is no interference at all. In this case the cancelation unit may convert certain N number of antennas to M base station inputs where M<N.

Optionally, determining the presence of the interference signal is based on acquisition and/or tracking of the interference and interference channel. Optionally, the acquisition and/or tracking are performed automatically within the frequency sub-band and/or the full frequency band.

Optionally, the interference signal determination is based on detection of the presence of the desired signals within the signals received by the antennas, which may receive both interference and desired signals. Detection of the desired signal may avoid reduced levels of cancellation due to masking of the interference by the desired signals. This may occur, for example, in cases of relatively low level of interference (e.g., interference which is close to or below the power level of the desired signals). Detection of the desired signal may avoid improper cancellation of the desired signal in the frequency band portion in which the interference signal is not dominant. For example, the system might improperly adapt to cancel a desired signal rather than interference signals, for example, when the desired signal is dominant and the interference cancellation process was applied (e.g., mistakably applied).

The desired signals may be detected, for example, by a desired signal module 224F.

Determining the presence of the interference signal based on differentiation between interference and desired signals may be performed using one or more methods.

Optionally, the interference signal determination is based on coordinating between receiver processor 208 and interference cancellation unit 204. Alternatively or additionally, the interference signal determination is based on predefined characteristics of the desired signals and/or of the interference signals. Other methods may also be used.

In one example, determining the presence of the interference signal is based on synchronized muting. Interference cancellation unit 204 is provided with information regarding periods of time when there is no desired signal reception (i.e., muted times). In these time periods, the site antennas are expected to receive only the interference signals. The mute interval may exist, for example, during the guard time of TDD base stations. Optionally, during these time periods, interference cancellation unit 204 performs tracking and/or acquisition of the interference signals, without disturbance from the desired signals. In other time periods when desired signals are received (e.g., corrupted signals), interference cancellation unit 204 may apply interference cancellation. For example, interference cancellation unit 204 may freeze its cancellation weights and use the weights acquired during the time desired signals were muted.

The information of the muted time periods is provided, for example, by one or more dedicated links from receiver processor 208, by programming interference cancellation unit 204, by one or more modules stored on memory 222, and/or by analysis of the receiving unit 202 communication protocol (e.g., assuming no reception during transmission for TDD).

The synchronized muting method may be used, for example, in the installation arrangement that provides for the coordination between protected receiver 208 and interference cancellation unit 204. For example, in the implementation form of interference cancellation unit 204 embedded into receiving unit 202 and/or receiving processor 208.

Optionally, periodical muting of the desired signal is intentionally selected and/or controlled, for example, preprogrammed by the manufacturer, programmed at installation, and/or based on the receiver scheduler of receiver unit 202. The periodical muting periods may help ensure that the acquisition and/or tracking process is fast enough to track changes in the interference source and/or channel. For example, the frequency of the muting periods is selected according to the tolerance of tracking changes in the received signal. Alternatively or additionally, the protected receiver 208 may only signal to the interference cancellation unit 204 when such muting periods exist, without intentional muting of desired signals transmission. In this case, control of the system's scheduler may not be required. There may be no loss of capacity in receiving unit 202 by the muting periods. Optionally, the interference cancellation unit 204 performs tracking only at periods when the received desired signal is not expected, and/or during temporary muting periods when client 212 activity is below a predefined threshold.

Optionally, the muting is random. For example, during certain intervals in which the users do not communicate with the base station, and/or there may be frequency sub-bands that are not being currently used by the users. Optionally, the system detects these occasional muting time periods (in the entire band or in sub-bands), and calculates the cancellation weights for the frequency sub-band where there are no dominant desired signals.

Optionally, the presence of the interference signal between muting periods (i.e., corrupted signal) is based on the presence of the interference signal at an earlier muting period. The muting method may allow for differentiation between corrupted and uncorrupted signals to take place based on the state of the interference signals during the muting periods.

In another example, determining the presence of the interference signal may be based on guard time intervals (e.g., transmit and/or receive). For example, receiving unit 202 operates using TDD. The uplink transmission (from clients 212 to receiving unit 202) is inactive during periods of transmission by receiving unit 202. The uplink is also inactive during the guard time intervals before and/or after the transmission periods of receiving unit 202. During these time intervals, interference signals (i.e., without the presence of desired signals) may be received. Interference acquisition and/or tracking may be performed.

In yet another example, determining the presence of the interference signal is based on a signal detection method. Optionally, the signal detection method is performed when there is no coordination between receiving unit 202 and interference cancellation unit 204. For example, receiving unit 202 operates with frequency domain duplexing (FDD). Optionally, interference determination module 224A detects activity and/or inactivity periods of desired signals received at receiving unit 202. Optionally, signals are detected based on certain characteristics of the received signals, for example, preambles, chip, symbol clock, WCDMA/CDMA chip clock and/or other predefined characteristics. Module 224A then signals interference cancellation unit 204 when there are no desired signals present. Interference cancellation unit 204 may perform at that time acquisition and/or tracking of the interference signal. Optionally, determining the presence of the interference signal is based on differentiation between interference signals and corrupted signals (i.e., desired signals with interference).

In yet another example, determining the presence of the interference signal is based on the polar antenna diversity arrangement of antennas 206A-B. The received desired signal may have a polarization (e.g., arbitrary elliptical) that is different from the polarization of the received interference. For example, the projected component of the desired signal polarization may point towards the interference polarization in a manner that is sufficiently low to avoid significant degradation in the desired signal reception performance. Optionally, determining the presence of the interference signal is based on differentiation between interfering signals and desired signals.

In yet another example, determining the presence of the interference signal is based on the spatial and/or directional antenna diversity arrangement of antennas 206A-B. Clients 212 may have a destination angle towards receiving unit 202 which may be sufficiently different from the destination angle of interferer 214. Optionally, determining the presence of the interference signal is based on differentiation between interfering signals and desired signals in received power level.

In yet another example, determining the presence of the interference signal, acquisition and/or tracking are performed in the presence of desired signal reception. The interference signal reception may be sufficiently prominent and/or stronger over the desired signal reception. Based on the interferer reception strength, a power inversion rule may be utilized, which denotes that the desired signal to interference signal ratio at the output of interference cancellation unit 204 is bounded by the interference signal to desired signal ratio at the input of interference cancellation unit 204 during cancellation weight acquisition.

In yet another example, the level of rejecting the interference signal is based on the relative number of interferes 214, antennas 206A-B and/or clients 212. The determining may be based on the presence of sufficient degrees of freedom for application of interference cancellation. Optionally, the number of interferers 214 is lower than the number of antennas 206A-B. The number of interferes 214 lower than the number of antennas 206A-B may provide sufficient degrees of freedom to apply the interference cancellation. Optionally, the number of the desired signal transmitters (e.g., clients 212) operating simultaneously in time and/or frequency is higher than the number of the antennas 206A-B. During periods of interference absence, when the received signals are mainly composed from the desired signals transmitted by clients 212 (optionally at similar power levels), significant cancellation of the desired signal may not occur due to lack of degrees of freedom. Degradation of the desired signal reception, even in case of interference absence may be prevented.

In yet another example, determining the presence of the interference signal is based on predefined characteristics, for example, pattern intervals or some statistical significance of the interference signal, for example, a barker signal of radar, a TV synchronization signal, a DECT synchronization signal, or other predefined signal characteristics. Optionally, intermittent activation of the operation of the interference cancellation unit 204 for applying interference cancellation and/or the intermitted operation of the acquisition and tracking are based on the predefined characteristics. Optionally, determining the presence of the interference signal is based on differentiation between corrupted signals and non-corrupted signals.

Optionally, determining the presence of the interference signal using any of the methods described herein (or other methods), is based on examining the differentiation in correlation to known interference signatures, between corrupted and/or uncorrupted signals. For example, the pre-identified signature of the interference signals may be correlated with corrupted signals if the interference is present.

Optionally, at 105, modes of operations are switched, for example, by a switch decision module 224B for making the decision to switch, and/or by switch module 226 that makes the switch in operation modes. Alternatively, switching is not performed, for example, switch module 226 does not exist or is bypassed. Signals may pass directly from antennas 206A-B to processor 220 (e.g., for interference cancellation processing) and then to receiver processor 208. Optionally, when switching is not performed, interference cancellation (block 106) may be applied.

Switching may be performed for the entire received frequency bands. Alternatively, switching is performed on received sub-bands. Switching of sub-bands may be performed independently for each of the sub-bands.

Optionally, switching is performed for each sub-band, depending on the type of signal that is to be provided to the base station as output. For example, to provide the same clean signal (after processing) to both inputs of the base station (e.g., interference cancellation mode). Another example is to provide the original received from the antennas in the same manner as when it was received from the antennas, which may preserve the diversity scheme (e.g., bypass mode, transparent mode).

Optionally, signal processing is performed in the frequency domain. The frequency domain processing may allow switching between interference cancellation modes and diversity mode per small frequency sub-bands, for example, frequency bins. Optionally, when the number of dominant interference signal is less than the number of antennas minus one in the sub-band, the output signal of the sub-band may have low interference signal and be in the diversity ready state for the base station receiver.

Optionally, where there are more than 2 antennas, the signal outputs generated for the sub-bands (e.g., frequency bins) that have interference signals may be different for each base station antenna. Optionally, concurrent cancellation and/or diversity are applied the frequency bins.

Optionally, in the case of multiple interference signals and/or channels, switching is performed based on the presence or termination of the multiple interference signals and/or channels. For example, when one interference signal has terminated, but another interference signal remains, when there are enough antennas, both cancelation and diversity schemes may be automatically applied, for example, to different sub-bands.

Optionally, at 106, interference cancellation is applied, for example, by an interference cancellation and/or diversity module 224D. Optionally, interference cancellation is applied during detection of received corrupted signals, at 104. Optionally, the interference cancellation is applied to cancel the interfering signals from the corrupted signals, to result in clean signals composed from the desired signals without significant interference signals.

Optionally, module 224D calculates interference cancellation weights. Optionally, the weights are added to the received signals, for example, by beam former module 224E.

Interference cancellation is performed by suitable methods of interference cancellation, for example, a least mean square (LMS) based algorithm, a minimum mean square error (MMSE) based algorithm or direct matrix inversion based on the Wiener Hoff solution, or other methods, such as methods that perform zero-forcing weight calculations directly from channel estimation.

Figure 8:
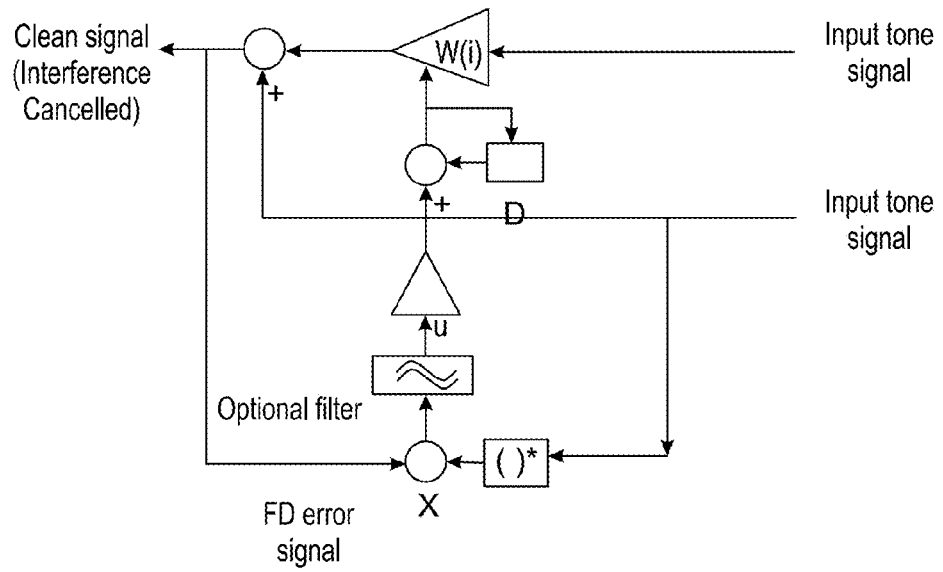
FIG. 8 is a schematic of an exemplary interference cancellation weight calculator, in accordance with some embodiments of the present invention.

Reference is now made to FIG. 8, which is a schematic of an exemplary interference cancellation weight calculator, in accordance with some embodiments of the present invention. Optionally, the interference cancellation weight calculator calculates the weights of the receiver beam-former. Optionally, the interference cancellation is applied in the frequency domain, for example, on each tone of the Overlap and Save (OLAS) or Window Overlap and Add (WOLA) filters. Optionally, $\mu$ sets the dynamics of the loop. The interference cancellation weight calculator may be implemented, for example, with the system described below with reference to FIG. 5, or other suitable systems.

Referring now back to FIG. 1, alternatively or additionally, at 108, interference cancellation is not applied. Optionally, receiving unit 202 operates with the existing antenna diversity. Optionally, interference cancellation unit 204 is by-passed by the received signals. Alternatively or additionally, the received signals are directed through interference cancellation unit 204, but are not processed for interference cancellation. Alternatively or additionally, the received signals are directed through interference cancellation unit 204, and are processed for diversity mode.

Optionally, interference cancellation and antenna diversity are both operating simultaneously, for example, interference cancellation is applied to some frequencies, and antenna diversity is operating on other frequencies, as described herein.

Optionally, at 109, a suitable combination is generated, for example, by interference cancellation module 224D, for example, using one or more methods described herein. For example, the suitable combination is based on one or more of the following: injection of correlated noise signals, calculation of cancellation weights, switching between diversity mode and interference cancellation mode, and/or other methods.

Optionally, the suitable combination of the received signals is calculated so that, the interference signal is reduced (e.g., minimized) and the impact of the interference cancellation on the desired signals is reduced (e.g., minimized). Optionally, the suitable combination is an optimal solution to the trade off in which both the interference signal and the impact of the desired signals are minimized.

Optionally, when concurrent interference signals in the same frequency sub-bands are received with concurrent desired signals in the same frequency sub-bands, with the received power of the interference signals being significantly higher than the received power of the desired signal, the suitable combination is calculated such that the cancellation weights calculated based on the existence of the interference signals and desired signals cancel the output interference signal, and leave the desired signal for providing to the base station receiver substantially unaffected.

Optionally, the suitable combination is based on calculating multiple cancellation weights, the cancellation weights correspond to frequency sub-bands that do not carry dominant interference signals are set to zero, so that a diversity scheme of the received signals is substantially preserved for performance of the diversity scheme in the base station receiver, and the expected change in the wireless channel of the received desired signal as measured by the base station in frequency sub-bands where there are no dominant interference signals is negligible.

Optionally, at 110, the desired signals are provided to network 210 for forwarding. Alternatively or additionally, the calculated suitable combination is provided, for example, to receiver processor 208. The provided signals may be clean desired signals that have had interference cancellation applied by interference cancellation unit 204, or uncorrupted desired signals received by antennas 206A-B during antenna diversity operation (i.e., interference cancellation not applied).

Optionally, at 112, performance of receiving unit 202 is monitored.

Optionally, the case of the number of the clients 212 transmitting desired uplink signals being lower than number of the antennas 206A-B is determined, for example, by receiver processor 208. The risk of suppressing received desired signals may be detected.

Optionally, the level of interference is monitored. The level of interference may be monitored without the application of interference cancellation, and/or after application of interference cancellation.

Optionally, at 114, system components are adjusted. Optionally, the adjustment is based on the monitoring. The adjustment may be performed to improve interference cancellation.

Optionally, antennas are added to receiving unit 202. Additional (e.g., auxiliary) antennas may be added in the case of a single pre-existing antenna, to provide multiple antennas to allow interference cancellation. Alternatively, additional antennas may be added in the case of multiple pre-existing antennas. Optionally, the number of additional antennas is selected based on the number of simultaneous interferers (in time and/or frequency). The number of additional antennas may be equal to or greater than the number of simultaneous interferes, to allow the interference cancellation to be performed to cancel interference from all the simultaneous interferes.

Optionally, the presence of additional interference signals is determined. When the total number of determined interference signals is equal to the number of existing antennas, additional directional antennas may be deployed. The additional antennas may be installed with a direction towards the additional interference signal, so that the additional interference signal is cancelled based on the additional direction antenna. Optionally, the pre-existing antennas are arranged for spatial and/or polar diversity.

Alternatively, additional antennas are not required, for example, the number of pre-existing antennas or previously added antennas is sufficient. Optionally, the number of concurrent interferers 214 (in time and/or frequency) may be lower than the number of receive antennas 206A-B. Optionally, sufficient degree of freedom is present for successful interference cancellation, for example, in the case of spatial and/or directional antenna diversity arrangements.

Alternatively or additionally, synthetic noise is added to the received desired signals obtained from antennas 206A-B, for example, by a beam former module 224E. Synthetic noise may be generated by a synthetic noise module 224C. The synthetic noise may reduce the risk of suppressing the desired signals. Optionally, synthetic correlated noise signals are added when there is an indication of uplink signals during the cancellation weights adaptation. For example, for the two antenna case, the same complex baseband noise signal with different phases (for each input) may be applied to both inputs. The power of the injected noise signal may be approximately equal to the power of the desired signal at the interference cancellation unit 204 output (after the interference cancellation). This signal is optionally removed from the baseband signal prior to providing the signal to receiving processor 208. The number of injected correlated noise signals should be equal to the number of antennas 206A-B minus one. This may help ensure that in any case, when the number of desired uplink signals is less than the number of antennas, the desired signals will not be suppressed by the applied interference cancellation process, due to the existence of the other synthetic signals that aim to consume the degrees of freedom of the applied interference cancellation process.

Alternatively or additionally, system components are adjusted to help reduce interference levels. Optionally, the null of one or more antennas 206A-B are adaptively positioned towards interferer 214. For example, in the case of spatial diversity the composed antenna pattern null is steered towards the direction of interferer 214, for example by issuing cancellation weights to the beam former, for example, through cancellation weights calculator. Alternatively or additionally, antennas 206A-B are adjusted to avoid or reduce reception from the polarization of interferer 214, for example, the polarity of antennas 206A-B is adjusted.

Alternatively or additionally, narrow band noise is detected. In the case of interference cancellation applied in the frequency domain (FD), there is a risk that FD tones that do not carry any interference (only uplink desired signals) may be suppressed by the applied cancellation interference process, which may hamper the desired signal detection. The desired signal suppression may be avoided and/or reduced by one or several tests for the frequency domain tone level. Alternatively or additionally, correlated synthetic noise is injected to prevent or reduce suppression of the desired signals.

Optionally, at 116, the method is iterated. Optionally, the iteration provides dynamic and/or automatic switching between interference cancellation mode (e.g., block 106) and diversity operation mode (e.g., block 108), in frequency sub-bands and/or for the entire frequency band.

Optionally, the method is repeated with application of adjustments performed as part of block 114.

Figure 5:
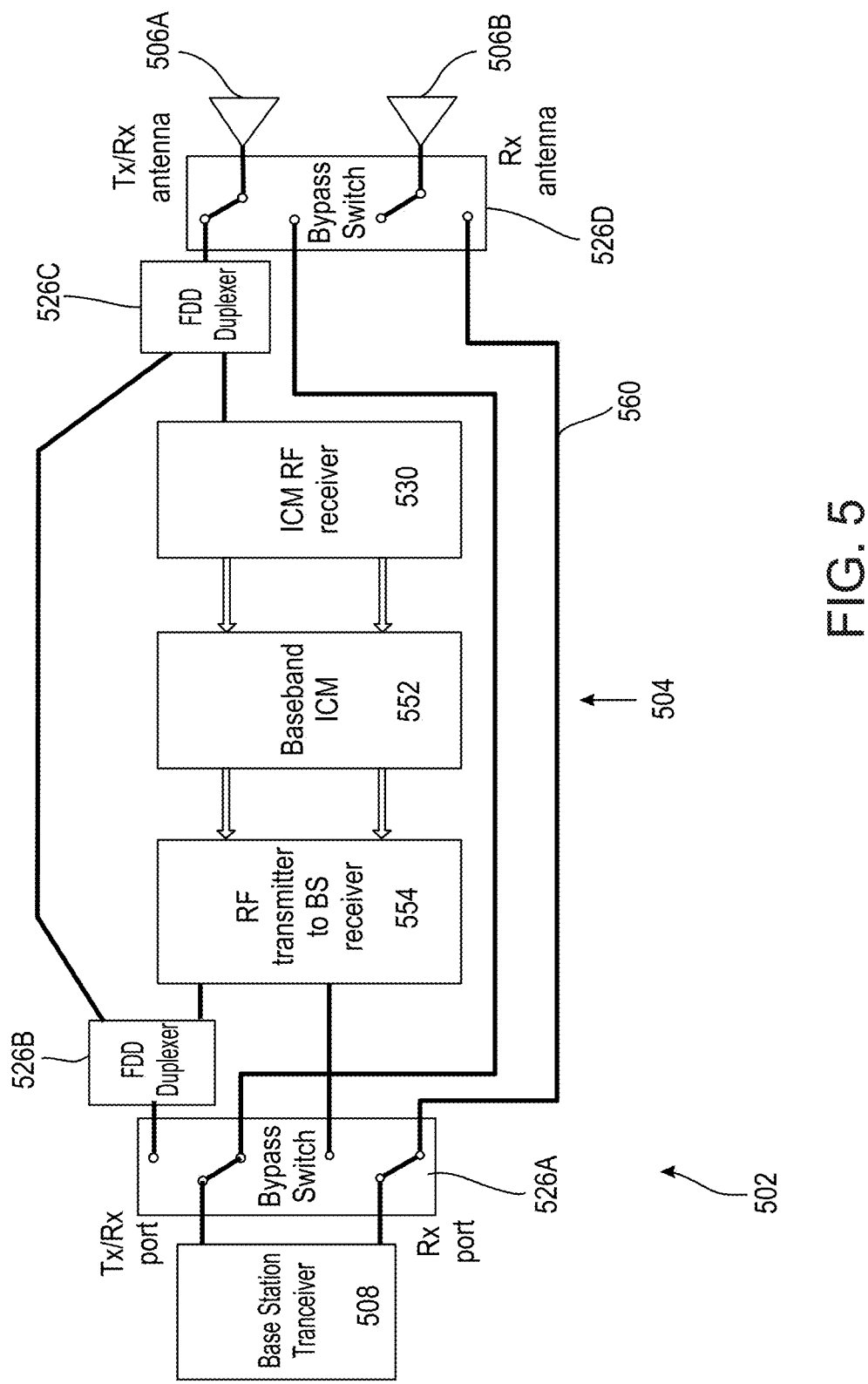
FIG. 5 is a top level block diagram of an exemplary implementation of the system of FIG. 2, in accordance with some embodiments of the present invention.

Reference is now made to FIG. 5, which is a top level block diagram of an exemplary implementation of the system of FIG. 2, in accordance with some embodiments of the present invention. The implementation is described for protecting a WCDMA base station uplink reception, but may be utilized for other wireless technologies.

A base station transceiver 508 is in electrical communication with antennas 506A-B. An interference cancellation function (ICF) module 504 is in electrical communication along the signal path between transceiver 508 and antennas 506A-B. Optionally, one or more bypass switches 526A and/or 526D direct signal flow through ICF module 504, or direct signals to bypass ICF module 504. The interference may be seasonal, temporary, or may not exist during the long term, so that switches 526A 526D may direct signals through ICF module 504 when the interference is present and bypass ICF module 504 when the interference is not present.

Submodules 550, 552 and/or 554 of ICF module 504 may correspond to respective submodules 350, 352 and/or 354 of FIG. 3. Duplexers 526B-C may correspond to duplex 356A-B.

Optionally, the interference cancellation is calculated in the frequency domain agnostically to the received WCDMA signal. Optionally, a broadband adaptive filter is implemented with the OLAS and/or WOLA stages, such as OLAS buffering, Inverse Fast Fourier Transform (IFFT), and/or Fast Fourier Transform (FFT), with weighting of each bin in the frequency domain.

Optionally, the time duration of the OLAS window is derived from the root mean square (RMS) delay spread of the desired signal and the interference. The duration may be higher with margin. The number of frequency domain bins (the IFFT/FFT size) may be derived from the baseband sampling clock, which itself may be derived from the signal bandwidth (e.g., to meet Nyquist sampling).

Optionally, the weight calculation performed by applying a LMS algorithm on each FD (frequency domain) bin.

Optionally, the synchronized muting method (e.g., as described with reference to block 104) of the desired signals is not available. The cancellation may be based on prominent interference signals (e.g., as described with reference to block 104), which may drive the weights to cancel the interference signals.

Optionally, as the interference signals may not be present at all times, certain measures in the implementation may detect the presence of interference signals in order to avoid or reduce cancellation of the desired signal in the case of interference signal absence.

Optionally, output from ICF module 504 is issued to one of the base station transceiver 508 input ports. The other port may be connected directly through a delay line, which bypasses the ICF module 504. This connection topology may help ensure that with the maximal-ratio combining (MRC) process at base station transceiver 508 the aggregated signal-to-interference-plus-noise ratio (SINR) of both ports is equal or better than the SINR at each port. In case of interference existence, the SINR of the cancellation port is higher than the SINR of the bypass port, such that the cancellation port is practically selected by the MRC of base station transceiver 508. In case of degradation in the desired signal due to the cancellation process, the direct port will be selected as exhibiting better SINR. In the case of no interference existence, the MRC will combine both antenna 506A-B inputs as was originally desired for without the interference case.

Figure 6:
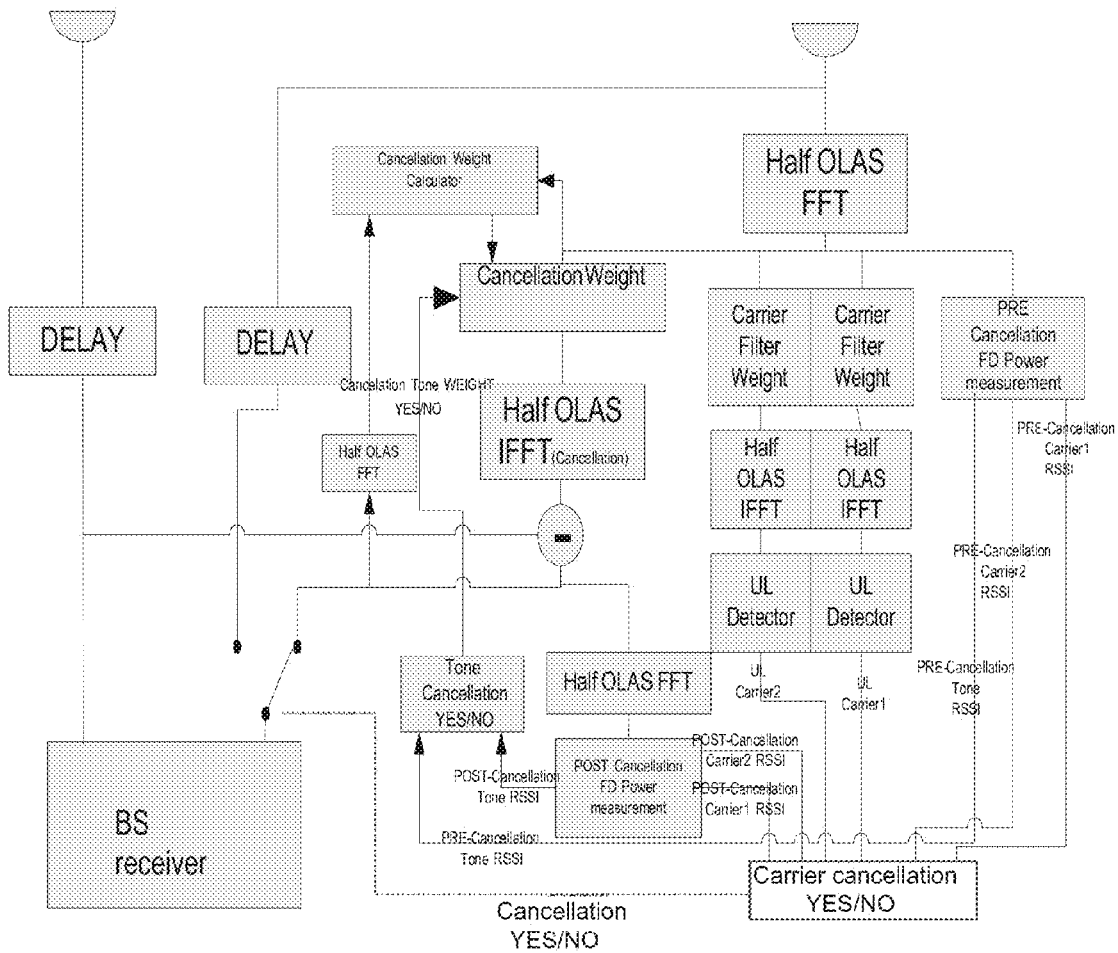
FIG. 6 is a schematic of an exemplary implementation of the baseband processing of the interference cancellation module of FIG. 5 and/or FIG. 2, in accordance with some embodiments of the present invention.

Reference is now made to FIG. 6, which is an exemplary implementation of the baseband processing of the interference cancellation module, for example, baseband ICM module 552 of ICF module 504 of FIG. 5, and/or of interference cancellation module 204 of FIG. 2, in accordance with some embodiments of the present invention.

Referring back to FIG. 5, optionally, ICF module 504 is programmed to detect the existence of interference signals. Optionally, switch 526A at the base station port directs signals based on the case of interference existence or absence. Switch 526A switches between bypass and cancellation modes for ICF module 504.

Optionally, ICF module 504 is installed in a base station unit 502 supporting dual adjacent WCDMA carriers. Optionally, the baseband interference cancellation processing is applied simultaneously on the two adjacent WCDMA carriers. The system may be extended to higher numbers of WCDMA carriers.

Optionally, interference cancellation is applied continuously. Optionally, in the case of interference signal existence, ICF module 504 is selected as output to base station transceiver 508.

Optionally, the interference existence test is performed on both WCDMA carriers, optionally on a frequency domain tone basis. In case of positive interference presence detected in one carrier or both carriers (e.g., at least in one carrier the bandwidth was detected to have prominent co-channel interference) the output of ICF module 504 is selected by base station transceiver port switch 526A. In case of negative carrier test (e.g., no co-channel interference found at both carriers' bandwidth), ICF module 504 bypass is selected by base station transceiver port switch 526A. In case of FD tone test, a positive result places the weights on the pertinent tone according the LMS, while a negative result forces a fixed weight value of zero (0) to the pertinent tone.

Optionally, the following tests may denote a prominent interference existence. The tests may be performed per individual carrier:
When the Received Signal Strength Indication (RSSI) of the carrier is above a threshold:
An Interferer that causes low RSSI is assumed as non existent.
It may be assumed that the uplink usually does not raise RSSI significantly in WCDMA.
The RSSI of each carrier may be performed by calculating the power of each tone of the carrier and averaging with Infinite Impulse Response (IIR) over time for several OLAS frames.
Improper cancellation of carrier signals above a threshold may be prevented or reduced by the following:
Cancellation based on thermal noise (i.e., uncorrelated signal among the antennas) is not expected. Rejected is not expected based on multiple uplink desired receptions due to lack of antenna degrees of freedom.
Cancellation will be based on measured RSSI before and after cancellation.
Cancellation will be based on measurements in the frequency domain on a per carrier basis.
This test uses half OLAS-FFT on the clean signal—after cancellation.
RSSI prior and post cancellation will be conducted by calculating the power of each tone and averaging it with IIR over several OLAS frames.
No uplink detection:
Uplink detection uses, for example, OLAS or time domain filters for filtering, for example, based on the algorithm described below.
The CHIP factor is above a value that denotes 10 dB SNR.
The following interference existence test may be positive on a tone basis:
Cancellation of pertinent OLAS tone is above threshold.
There will be no cancellation based on tone of thermal noise (uncorrelated between the antennas) and multiple uplink desired receptions due to lack of degrees of freedom, in the case of more uplink transmitters than base station receiving antennas.
A tone that has not passed the cancellation threshold will be assigned zero weight. The weight zeroing may preserve the diversity to the tone (e.g., place the outputs in the ready state for diversity scheme, that may be performed by the base station, as measured by the base station receiver), and/or may avoid change of the wireless channel due to the cancellation filter of the tone.
As described herein, optionally synthetic correlated noise signals are injected into the system, for example, similar complex signals with different phases for inputs from each antenna.
The injected signal may be applied when there is a decision to apply interference cancellation, and there is positive detection of uplink signal after the cancellation (clean signal).

The power of the injected correlated noise may be selected so that its component in the clean signal port is approximately equal to the existing desired signals.

The injected synthetic noise signal may be removed from the clean signal port prior to issuing the clean signal to base station transceiver 508 and/or issued (optionally exclusively) to the weight calculation module in frequency domain form to impact (optionally exclusively) the weight values. This signal may be detected based on the cancellation weights (which are known to the system).

Figure 7:
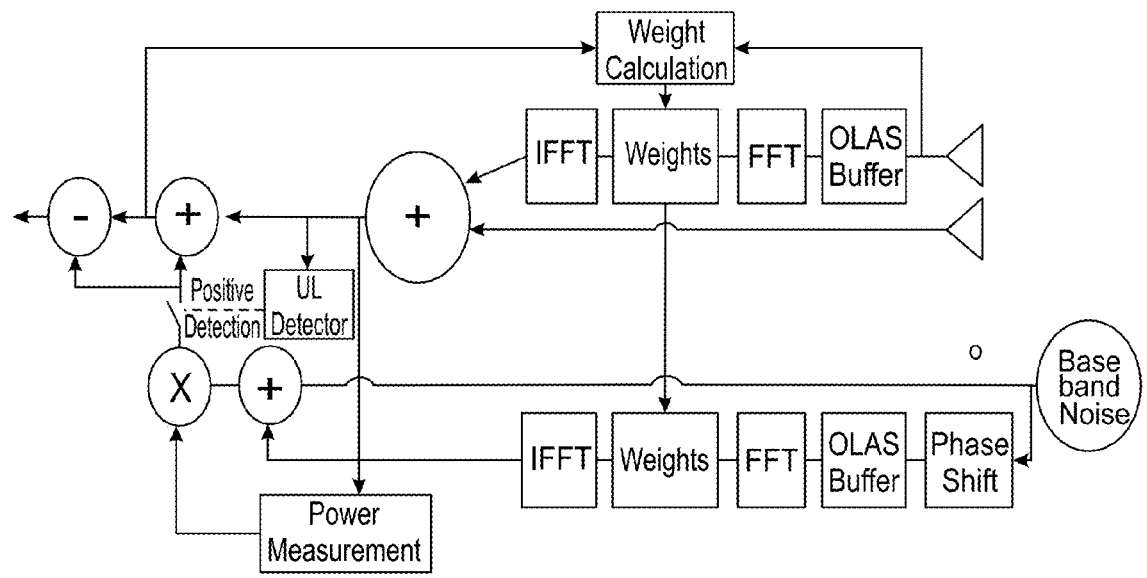
FIG. 7 is a schematic of an exemplary implementation of a synthetic noise injection module, in accordance with some embodiments of the present invention.

Reference is now made to FIG. 7, which is a schematic of an exemplary implementation of a synthetic noise injection module, for example, synthetic noise module 224C of FIG. 2, and/or a module suitable for implementation in FIG. 5, in accordance with some embodiments of the present invention.

Referring now back to FIG. 5, the antenna diversity of base station 502 is substantially preserved during the applied interference cancellation. Optionally, the interference cancellation is applied, and the antenna diversity is maintained simultaneously. Optionally, ICF module 504 in incorporated in receive diversity systems in which, for example, each of base station antennas 506A-B are arranged for orthogonal polarization relative to the other antenna. One or several different schemes may be undertaken in order to preserve the existing diversity feature of base station transceiver 508 during applied interference cancellation:

In one example, for the case of a narrow band interferer, the cancellation weights are calculated without the existence of uplink desired signals. The following signals (y1 and y2 respectively) are issued to the ports of base station antenna 506A-B. Signals y1 and y2 are extracted from the baseband signals that are received from antenna 506A-B (x1 and x2). w denotes the cancelling weight (x, y and w are assumed as an arbitrary frequency bin of the OLAS filter):

For base station antenna 506A port one: y1=x1−wx2
For base station antenna 506B port two: y2=x2−x1/w The value of w corresponds to weights for an arbitrary OLAS tone that is calculated only for the circuit of base station antenna 506A port #1. In the case of the narrow band interferer, the weights are calculated based on the interferer bins sampling and may not be based on any of the desired signal sampling. The value of the weight w for these bins may be very low (e.g., close to zero). The diversity may be maintained for these interference free bins.

In another example, the cancellation output y1=x1−wx2 is applied to base station transceiver 508 input port that received signals from antenna 506A, while to the other port, the direct signal from second antenna 506B is applied (x2). To implement this option, base station transceiver 508 is activated to perform Maximum Ratio Combining (MRC) on polar and/or spatial diversity. In case of interference signal detected, the received signal from antenna 506A will be selected. In case there is no interference the original MRC diversity is maintained.

Optionally, when the RSSI in certain frequency bins is lower than a predefined threshold, it may denote that those frequency bins do not contain interference signals. The weight w for those frequency bins (e.g., tones) may be zeroed and/or lowered significantly in amplitude. The outputted cleaned signal of the output bin (tone) may be equal to the input of the input bin(tone). The 2 clean output bins may be equal to the original input bin, such that the base station may be able to perform the MRC (Maximum Ratio Combining) diversity scheme (or other suitable schemes) on both inputs for these pertinent bins.

In yet another example, in case of the narrow interferer, the weight setting may be conducted with uplink signal existence together with injected correlated noise (as described herein). The weights for the tones that do not carry any of the interference signal components may be based on the uplink signals together with the injected correlated noise.

The following weighting for each bin (e.g., tone) with index n may be applied to the ports of the two antenna 506A-B respectively, where x1(n), x2(n) denote the frequency domain complex inputs from the respective antennas of bin n, and y(n) denotes the frequency domain complex output of the cancelation unit of bin n:

For base station antenna 506A port one: y1(n)=x1(n)−w1(n)x2(n)
For base station antenna 506B port two: y2(n)=x1(n)+w2(n)x2(n)

where w denotes the corresponding calculated weight for the interference free OLAS tone that is calculated for the base station antenna port one circuit. Bins that do not carry interference w1 and w2 may be forced to zero.

Figure 9:
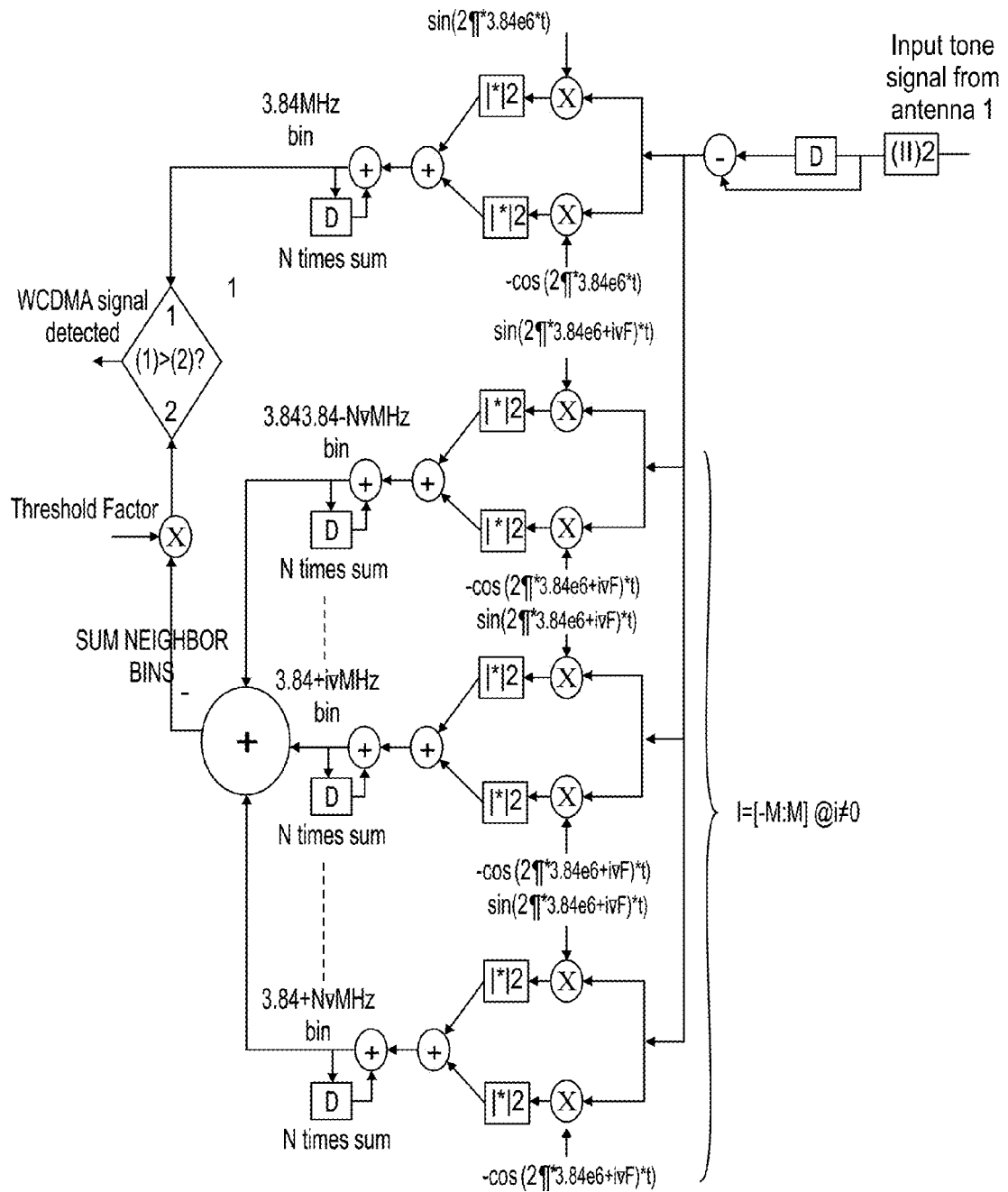
FIG. 9 is a schematic of an exemplary uplink detector, in accordance with some embodiments of the present invention.

Reference is now made to FIG. 9, which is a schematic of an exemplary uplink detector, in accordance with some embodiments of the present invention. Optionally, the uplink detector is implemented with a WCDMA system, for example, the system of FIG. 5. The uplink detector may be implemented with other suitable systems, for example, interference determination module 224A or FIG. 2, or other systems.

Optionally, the uplink detector is based on a squaring detector that is programmed to emphasize the chip clock of the WCDMA system at 3.84 MHz. The instantaneous power of the complex time domain input signal samples (e.g., sample by sample) that were acquired from one of antennas 506A-B may be derived. The output of the derivator may be processed with a Discrete Fourier Transform (DFT) of 2M+1 points, for example, by employing M adjacent Numerically Controlled Oscillators (NCO) around at each side of the chip frequency bin of 3.84 MHz, in order to verify if there is a 3.84 MHz tone above the surrounding tones within a predefined threshold. The frequency spacing between each NCO frequency may be ΔF.

Optionally, the DFT is calculated over a window of N samples.

Optionally, positive detection is declared based on the power sum of all surrounding bins being less by a predefined factor, than the power sum of the 3.84 MHz tone which is the chip clock of the WCDMA.

It is expected that during the life of a patent maturing from this application many relevant receiving units will be developed and the scope of the term receiving unit is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An add-on receiver module for mitigating foreign interference complementing a receiver of a wireless network, the receiver module comprising:
   a first interface for electrically coupling to a plurality of antennas for reception of desired signals and interference signals;
   wherein the plurality of antennas are arranged in an antenna diversity scheme;
   a hardware processor; and
   a non-transitory memory having stored thereon program modules for instruction execution by the hardware processor, comprising:
      an interference determination module for determining the presence of an interference signal originating from at least one foreign external transmitting source in the received signals, and for determining a termination of the interference signal;
      a desired signal detection module for determining the presence of a desired signal originating from the wireless communication network in the received signals;
      an interference cancellation module for calculating a suitable combination of the received signals, wherein the effect induced by the interference signal is reduced and the impact of an interference cancellation on the desired signals is reduced;
   a second interface for electrically coupling to a receiver unit of the wireless communication network, wherein the suitable combination is provided to the receiver unit by the second interface; and
   a synthetic noise module for injecting synthetic correlated noise signals into each received desired signals antenna input, the number of injected correlated noise signals being equal to the number of antennas, the synthetic noise generated to prevent suppression of received desired signals when a number of transmitting client transceivers is lower than the number of antennas, the suitable combination based on the injected synthetic correlated noise signals;
   wherein the receiver module operates complementary to the receiver unit of the wireless network and the plurality of antennas;
   wherein the receiver module is coupled within a signal receive path between the plurality of antennas of the receiver unit and the antenna ports of the receiver unit.

2. An add-on receiver module for mitigating foreign interference complementing a receiver of a wireless network, the receiver module comprising:
   a first interface for electrically coupling to a plurality of antennas for reception of desired signals and interference signals;
   wherein the plurality of antennas are arranged in an antenna diversity scheme;
   a hardware processor; and
   a non-transitory memory having stored thereon program modules for instruction execution by the hardware processor, comprising:
   an interference determination module for determining the presence of an interference signal originating from at least one foreign external transmitting source in the received signals, and for determining a termination of the interference signal;
   a desired signal detection module for determining the presence of a desired signal originating from the wireless communication network in the received signals;
   an interference cancellation module for calculating a suitable combination of the received signals, wherein the effect induced by the interference signal is reduced and the impact of an interference cancellation on the desired signals is reduced; and
   a second interface for electrically coupling to a receiver unit of the wireless communication network, wherein the suitable combination is provided to the receiver unit by the second interface;

wherein the receiver module operates complementary to the receiver unit of the wireless network and the plurality of antennas;

wherein the receiver module is coupled within a signal receive path between the plurality of antennas of the receiver unit and the antenna ports of the receiver unit;

wherein concurrent interference signals in the same frequency sub-bands are received with concurrent desired signals in the same frequency sub-bands, the received power of the interference signals being significantly higher than the received power of the desired signal, the suitable combination calculated such that cancellation weights calculated based on existence of interference and desired signal reject the output interference signal, and leave the desired signal provided to the receiver of a base station substantially unaffected.

3. The receiver module of claim 2, wherein the suitable combination is based on avoiding cancellation of a desired signal rather than interference signals.

4. The receiver module of claim 2, wherein the interference determination module and/or the desired signal detection module are further programmed to determine based on detecting received desired signals based on certain characteristics of the received desired signals.

5. The receiver module of claim 2, further comprising one or more switch modules for directing the received signals to interference cancellation or to diversity reception, based on the interference determination module determination, the suitable combination comprising applying interference cancellation or diversity reception.

6. The receiver module of claim 2, wherein the receiver module is arranged as a self-contained structure for coupling to the receiver of the wireless network and the plurality of antennas.

7. The receiver module of claim 2, further comprising:
one or more switch modules for directing the received signals to interference cancellation or to diversity reception, based on the interference determination module determination.

8. The receiver module of claim 7, wherein the same antenna port is used for transmitting and receiving RF signals, wherein the switch modules are in electrical communication between the antennas and an interference cancellation unit, and between the interference cancellation unit and receiving circuitry, the switch modules programmed to direct signals on an uplink path through the interference cancellation unit, and to direct signals on a downlink path to bypass the interference cancellation unit.

9. The receiver module of claim 7, wherein at least one of the switch modules is a duplexing filter for the system operating with Frequency-division duplexing, or a switch for the system operating with time-division duplexing.

10. The receiver module of claim 7, wherein the hardware processor, the non-transitory memory, and the switching module are integrated into an interference cancellation unit that is a stand-alone device.

11. The receiver module of claim 7, wherein the hardware processor, the non-transitory memory, and the switching module are disposed within an existing housing.

12. The receiver module of claim 7, further comprising a synchronization mechanism for coordination between receiving circuitry and the switching module for communication of time periods when there is no reception of desired signals, and wherein the switching module detects the interference signals based on the time periods.

13. The receiver module of claim 7, further comprising a module for calculating interference cancellation weights for cancelling the interference signals.

14. An add-on receiver module for mitigating foreign interference complementing a receiver of a wireless network, the receiver module comprising:
a first interface for electrically coupling to a plurality of antennas for reception of desired signals and interference signals;
wherein the plurality of antennas are arranged in an antenna diversity scheme:
a hardware processor; and
a non-transitory memory having stored thereon program modules for instruction execution by the hardware processor, comprising:
an interference determination module for determining the presence of an interference signal originating from at least one foreign external transmitting source in the received signals, and for determining a termination of the interference signal;
a desired signal detection module for determining the presence of a desired signal originating from the wireless communication network in the received signals;
an interference cancellation module for calculating a suitable combination of the received signals, wherein the effect induced by the interference signal is reduced and the impact of an interference cancellation on the desired signals is reduced; and
a second interface for electrically coupling to a receiver unit of the wireless communication network, wherein the suitable combination is provided to the receiver unit by the second interface;
wherein the receiver module operates complementary to the receiver unit of the wireless network and the plurality of antennas;
wherein the receiver module is coupled within a signal receive path between the plurality of antennas of the receiver unit and the antenna ports of the receiver unit;
wherein the interference cancellation module is further programmed calculate the suitable combination based on calculating a plurality of cancellation weights, the cancellation weights correspond to frequency sub-bands that do not carry dominant interference signals are set to zero, so that a diversity scheme of the received signals is substantially preserved for performance of the diversity scheme in the receiver of a base station, and the expected change in the wireless channel of the received desired signal as measured by the base station in frequency sub-bands where there are no dominant interference signals is negligible.

15. The receiver module of claim 14, wherein the interference determination module determines the presence of the interference signal based on the received signals without additional information from the wireless network, the desired signal detection module determines the presence of the desired signal based on the received signals without additional information from the wireless network, and the interference cancellation module calculates the suitable combination without additional information from the wireless network.

16. The receiver module of claim 15, wherein without additional information comprises one or more of: controlling transmission of signals within the wireless communication network, requesting transmission of special signals, muting the wireless communication network, and polling elements within the wireless communication network, and exploiting instantaneous signature within the desired signals, and exploiting one or more of: pilot signals, preamble signals, sounding signals within the desired signals.

17. The receiver module of claim 14, wherein the receiver module operates externally to the receiver unit of the wireless communication network and the plurality of antennas.

18. An add-on receiver module for mitigating foreign interference complementing a receiver of a wireless network, the receiver module comprising:
    a first interface for electrically coupling to a plurality of antennas for reception of desired signals and interference signals;
    wherein the plurality of antennas are arranged in an antenna diversity scheme;
    a hardware processor; and
    a non-transitory memory having stored thereon program modules for instruction execution by the hardware processor, comprising:
        an interference determination module for determining the presence of an interference signal originating from at least one foreign external transmitting source in the received signals, and for determining a termination of the interference signal;
        a desired signal detection module for determining the presence of a desired signal originating from the wireless communication network in the received signals;
        an interference cancellation module for calculating a suitable combination of the received signals, wherein the effect induced by the interference signal is reduced and the impact of an interference cancellation on the desired signals is reduced; and
        a second interface for electrically coupling to a receiver unit of the wireless communication network, wherein the suitable combination is provided to the receiver unit by the second interface;
    wherein the receiver module operates complementary to the receiver unit of the wireless network and the plurality of antennas;
    wherein the receiver module is coupled within a signal receive path between the plurality of antennas of the receiver unit and the antenna ports of the receiver unit;
    wherein the interference determination module and/or the desired signal detection module are further programmed to determine when the power level of the interference signals is near or less than the power level of desired signals, the suitable combination based on the detected power level.

19. An add-on receiver module for mitigating foreign interference complementing a receiver of a wireless network, the receiver module comprising:
    a first interface for electrically coupling to a plurality of antennas for reception of desired signals and interference signals;
    wherein the plurality of antennas are arranged in an antenna diversity scheme;
    a hardware processor; and
    a non-transitory memory having stored thereon program modules for instruction execution by the hardware processor, comprising:
        an interference determination module for determining the presence of an interference signal originating from at least one foreign external transmitting source in the received signals, and for determining a termination of the interference signal;
        a desired signal detection module for determining the presence of a desired signal originating from the wireless communication network in the received signals;
        an interference cancellation module for calculating a suitable combination of the received signals, wherein the effect induced by the interference signal is reduced and the impact of an interference cancellation on the desired signals is reduced; and
        a second interface for electrically coupling to a receiver unit of the wireless communication network, wherein the suitable combination is provided to the receiver unit by the second interface;
    wherein the receiver module operates complementary to the receiver unit of the wireless network and the plurality of antennas;
    wherein the receiver module is coupled within a signal receive path between the plurality of antennas of the receiver unit and the antenna ports of the receiver unit;
    wherein the interference determination module and/or the desired signal detection module further comprise a time periods detection module for detecting time periods where desired signals are not received, and identifying the interference signals during the time periods.

20. An add-on receiver module for mitigating foreign interference complementing a receiver of a wireless network, the receiver module comprising:
    a first interface for electrically coupling to a plurality of antennas for reception of desired signals and interference signals;
    wherein the plurality of antennas are arranged in an antenna diversity scheme;
    a hardware processor; and
    a non-transitory memory having stored thereon program modules for instruction execution by the hardware processor, comprising:
        an interference determination module for determining the presence of an interference signal originating from at least one foreign external transmitting source in the received signals, and for determining a termination of the interference signal;
        a desired signal detection module for determining the presence of a desired signal originating from the wireless communication network in the received signals;
        an interference cancellation module for calculating a suitable combination of the received signals, wherein the effect induced by the interference signal is reduced and the impact of an interference cancellation on the desired signals is reduced; and
        a second interface for electrically coupling to a receiver unit of the wireless communication network, wherein the suitable combination is provided to the receiver unit by the second interface;
    wherein the receiver module operates complementary to the receiver unit of the wireless network and the plurality of antennas;
    wherein the receiver module is coupled within a signal receive path between the plurality of antennas of the receiver unit and the antenna ports of the receiver unit;
    wherein the number of antenna inputs into the first interface is higher than the number of signal outputs to the receiver through the second interface, wherein the number of interference signals is less than the number of antennas minus one, wherein there are sufficient degrees of freedom to perform the interference cancellation and to preserve the inherent diversity gain.

21. The receiver module of claim 20, wherein the receiver module provides to the receiver inputs signals with reduced cross correlation among each antenna input couple, so that diversity gain is achieved by providing to each receiver input different composite antenna array patterns through certain settings of beam former weights, wherein each receiver is connected to certain composite antenna array patterns with common nulls toward the interference signal direction and/or polarization, with a beam steered toward different direction and/or polarization of a base station cell geometry.

22. An add-on receiver module for mitigating foreign interference complementing a receiver of a wireless network, the receiver module comprising:
 a first interface for electrically coupling to a plurality of antennas for reception of desired signals and interference signals;
 wherein the plurality of antennas are arranged in an antenna diversity scheme;
 a hardware processor; and
 a non-transitory memory having stored thereon program modules for instruction execution by the hardware processor, comprising:
  an interference determination module for determining the presence of an interference signal originating from at least one foreign external transmitting source in the received signals, and for determining a termination of the interference signal;
  a desired signal detection module for determining the presence of a desired signal originating from the wireless communication network in the received signals;
  an interference cancellation module for calculating a suitable combination of the received signals, wherein the effect induced by the interference signal is reduced and the impact of an interference cancellation on the desired signals is reduced; and
 a second interface for electrically coupling to a receiver unit of the wireless communication network, wherein the suitable combination is provided to the receiver unit by the second interface;
 wherein the receiver module operates complementary to the receiver unit of the wireless network and the plurality of antennas;
 wherein the receiver module is coupled within a signal receive path between the plurality of antennas of the receiver unit and the antenna ports of the receiver unit;
 wherein the desired signal detection module for determining the presence of a desired signal originating from the wireless communication network in the received signals exploits long term known statistic parameters of the desired signals.

23. A method for mitigating foreign interference by complementing a receiver of a wireless network, comprising:
 using a plurality of antennas for reception of desired signals and interference signals;
 wherein the plurality of antennas are arranged in an antenna diversity scheme;
 determining the presence of an interference signal originating from at least one foreign external transmitting source in the received signals, and determining a termination of the interference signal;
 determining the presence of a desired signal originating from the wireless communication network in the received signals;
 calculating a suitable combination of the received signals, wherein the effect induced by the interference signal is reduced and the impact of an interference cancellation on the desired signals is reduced; and
 providing the suitable combination to a receiver of a wireless communication network;
 wherein the method is complementing a receiver of the wireless network and the plurality of antennas;
wherein determining comprises determining when the power level of the interference signals is near or less than the power level of desired signals, the suitable combination based on the detected power level.

24. A method for mitigating foreign interference by complementing a receiver of a wireless network, comprising:
 using a plurality of antennas for reception of desired signals and interference signals;
 wherein the plurality of antennas are arranged in an antenna diversity scheme;
 determining the presence of an interference signal originating from at least one foreign external transmitting source in the received signals, and determining a termination of the interference signal;
 determining the presence of a desired signal originating from the wireless communication network in the received signals;
 calculating a suitable combination of the received signals, wherein the effect induced by the interference signal is reduced and the impact of an interference cancellation on the desired signals is reduced; and
 providing the suitable combination to a receiver of a wireless communication network;
 wherein the method is complementing a receiver of the wireless network and the plurality of antennas;
wherein determining comprises determining by detecting time periods where desired signals are not received, and identifying the interference signals during the time periods.

25. The method of claim 24, wherein the presence of the interference signal is determined based on the received signals without additional information from the wireless network, the presence of the desired signal is determined based on the received signals without additional information from the wireless network, and the suitable combination is calculated without additional information from the wireless network.

26. The method of claim 24, wherein without additional information comprises one or more of: controlling transmission of signals within the wireless communication network, requesting transmission of special signals, muting the wireless communication network, and polling elements within the wireless communication network, and exploiting instantaneous signature within the desired signals, and exploiting one or more of: pilot signals, preamble signals, sounding signals within the desired signals.

27. The method of claim 24, wherein the method is performed externally to the receiver of the wireless communication network and the plurality of antennas.

28. The method of claim 24, wherein concurrent interference signals in the same frequency sub-bands are received with concurrent desired signals in the same frequency sub-bands, the received power of the interference signals being significantly higher than the received power of the desired signal, the suitable combination calculated such that the cancellation weights calculated based on existence of interference and desired signal reject the output interference signal, and leave the desired signal provided to the receiver of a base station substantially unaffected.

29. The method of claim 24, wherein calculating comprises calculating the suitable combination based on calculating a plurality of cancellation weights, the cancellation weights correspond to frequency sub-bands that do not carry dominant interference signals are set to zero, so that a diversity scheme of the received signals is substantially preserved for performance of the diversity scheme in the receiver of a base station, and the expected change in the wireless channel of the received desired signal as measured by the base station in frequency sub-bands where there are no dominant interference signals is negligible.

30. The method of claim 24, wherein the suitable combination is based on avoiding cancellation of a desired signal rather than interference signals.

31. The method of claim 24, wherein determining comprises determining based on detecting received desired signals based on certain characteristics of the received desired signals.

32. The method of claim 24, further comprising switching the received signals to interference cancellation or to diversity reception, based on the interference signal determination, the suitable combination comprising applying interference cancellation or diversity reception.

33. The method of claim 24, wherein the number of received antenna inputs is higher than the number of signal outputs to the receiver, wherein the number of interference signals is less than the number of antennas minus one, wherein there are sufficient degrees of freedom to perform the interference cancellation and to preserve the inherent diversity gain.

34. The method of claim 33, wherein providing comprises providing to the receiver inputs signals with reduced cross correlation among each antenna input couple, so that diversity gain is achieved by providing to each receiver input different composite antenna array patterns through certain settings of beam former weights, wherein each receiver is connected to certain composite antenna array patterns with common nulls toward the interference signal direction and/or polarization, with a beam steered toward different direction and/or polarization of a base station cell geometry.

35. A method for mitigating foreign interference by complementing a receiver of a wireless network, comprising:
using a plurality of antennas for reception of desired signals and interference signals;
wherein the plurality of antennas are arranged in an antenna diversity scheme;
determining the presence of an interference signal originating from at least one foreign external transmitting source in the received signals, and determining a termination of the interference signal;
determining the presence of a desired signal originating from the wireless communication network in the received signals;
calculating a suitable combination of the received signals, wherein the effect induced by the interference signal is reduced and the impact of an interference cancellation on the desired signals is reduced;
providing the suitable combination to a receiver of a wireless communication network; and
injecting synthetic correlated noise signals into each received desired signals antenna input, the number of injected correlated noise signals being equal to the number of antennas, the synthetic noise generated to prevent suppression of received desired signals when a number of transmitting client transceivers is lower than the number of antennas, the suitable combination based on the injected synthetic correlated noise signals;
wherein the method is complementing a receiver of the wireless network and the plurality of antennas.

36. A method for mitigating foreign interference by complementing a receiver of a wireless network, comprising:
using a plurality of antennas for reception of desired signals and interference signals;
wherein the plurality of antennas are arranged in an antenna diversity scheme;
determining the presence of an interference signal originating from at least one foreign external transmitting source in the received signals, and determining a termination of the interference signal;
determining the presence of a desired signal originating from the wireless communication network in the received signals;
calculating a suitable combination of the received signals, wherein the effect induced by the interference signal is reduced and the impact of an interference cancellation on the desired signals is reduced; and
providing the suitable combination to a receiver of a wireless communication network;
wherein the method is complementing a receiver of the wireless network and the plurality of antennas;
wherein determining the presence of a desired signal originating from the wireless communication network in the received signals is performed based on exploiting long term known statistic parameters of the desired signals.

37. An add-on receiver module for mitigating foreign interference complementing a receiver of a wireless network, the receiver module comprising:
a first interface for electrically coupling to a plurality of antennas for reception of desired signals and interference signals;
wherein the plurality of antennas are arranged in an antenna diversity scheme;
a hardware processor; and
a non-transitory memory having stored thereon program modules for instruction execution by the hardware processor, comprising:
an interference determination module for determining the presence of an interference signal originating from at least one foreign external transmitting source in the received signals, and for determining a termination of the interference signal;
a desired signal detection module for determining the presence of a desired signal originating from the wireless communication network in the received signals;
an interference cancellation module for calculating a suitable combination of the received signals, wherein the effect induced by the interference signal is reduced and the impact of an interference cancellation on the desired signals is reduced;
a second interface for electrically coupling to a receiver unit of the wireless communication network, wherein the suitable combination is provided to the receiver unit by the second interface; and
a remote radio head (RRH) located remotely from the hardware processor, the RRH communicating with the hardware processor using wired links transmitting digital signals, and a module stored on the memory containing program instruction for receiving digital baseband signals from the RRH, performing interference cancellation on the received digital baseband signals to generate a clean digital baseband signals, and transmitting the clean digital baseband signals over the wired link to the hardware processor, wherein the receiver module operates complementary to the receiver unit of the wireless network and the plurality of antennas;

wherein the receiver module is coupled within a signal receive path between the plurality of antennas of the receiver unit and the antenna ports of the receiver.

\* \* \* \* \*